(12) United States Patent
Viswambharan

(10) Patent No.: US 12,126,697 B2
(45) Date of Patent: Oct. 22, 2024

(54) METHODS AND APPARATUS TO IDENTIFY MAIN PAGE VIEWS

(71) Applicant: The Nielsen Company (US), LLC, New York, NY (US)

(72) Inventor: Sanjeev Kumar Viswambharan, Frisco, TX (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 17/876,276

(22) Filed: Jul. 28, 2022

(65) Prior Publication Data

US 2023/0216935 A1    Jul. 6, 2023

Related U.S. Application Data

(60) Provisional application No. 63/295,438, filed on Dec. 30, 2021.

(51) Int. Cl.
*H04L 67/568* (2022.01)
*H04L 12/46* (2006.01)
*H04L 67/564* (2022.01)

(52) U.S. Cl.
CPC ........ *H04L 67/568* (2022.05); *H04L 12/4641* (2013.01); *H04L 67/564* (2022.05)

(58) Field of Classification Search
None
See application file for complete search history.

(56) References Cited

U.S. PATENT DOCUMENTS

| 5,870,550 | A  |   | 2/1999 | Wesinger, Jr. et al. |
|-----------|----|---|--------|----------------------|
| 6,175,838 | B1 |   | 1/2001 | Papierniak et al.    |
| 6,178,439 | B1 | * | 1/2001 | Feit ............ H04L 9/40 |
|           |    |   |        |                   709/200 |
| 7,349,892 | B1 |   | 3/2008 | Virdy                |
| 8,661,111 | B1 |   | 2/2014 | Lauckhart et al.     |
| 8,799,643 | B2 |   | 8/2014 | Zhou et al.          |

(Continued)

FOREIGN PATENT DOCUMENTS

| CN | 103677505 | * | 12/2017 |
|----|-----------|---|---------|
| CN | 105160006 | * | 1/2019  |

(Continued)

OTHER PUBLICATIONS

Kayce et al Chrome .Developers. "View page resources" (Year: 2015).*

(Continued)

*Primary Examiner* — Younes Naji

(57) ABSTRACT

Methods, apparatus, systems, and articles of manufacture are disclosed to identify main page views. An example apparatus includes at least one memory, machine readable instructions, and processor circuitry to at least one of instantiate or execute the machine readable instructions to: access a log of requests from a proxy, the log of requests including main page requests and embedded page requests, the log of requests including timestamps corresponding to the main page requests and the embedded page requests, identify, based on consecutive ones of the timestamps occurring within a time interval, at least one of the main page requests associated with the time interval, and credit the at least one of the main page requests as a main page view.

20 Claims, 13 Drawing Sheets

(56) References Cited

U.S. PATENT DOCUMENTS

| | | | |
|---|---|---|---|
| 9,301,173 B2 | 3/2016 | Papakostas | |
| 9,319,292 B2* | 4/2016 | Wyatt | H04L 43/0876 |
| 9,552,334 B1 | 1/2017 | Meisels et al. | |
| 10,375,194 B2 | 8/2019 | Cimino et al. | |
| 10,721,299 B2 | 7/2020 | Anadon et al. | |
| 10,778,702 B1 | 9/2020 | Huang et al. | |
| 11,070,438 B1* | 7/2021 | Nayak | H04L 61/5007 |
| 11,165,877 B2 | 11/2021 | Papakostas et al. | |
| 2003/0163370 A1* | 8/2003 | Chen | G06Q 30/02 |
| | | | 705/14.52 |
| 2005/0188215 A1 | 8/2005 | Shulman et al. | |
| 2006/0212792 A1 | 9/2006 | White et al. | |
| 2008/0262991 A1 | 10/2008 | Kapoor et al. | |
| 2009/0164629 A1* | 6/2009 | Klein | H04L 43/0864 |
| | | | 709/224 |
| 2014/0280896 A1 | 9/2014 | Papakostas | |
| 2014/0372873 A1 | 12/2014 | Leung et al. | |
| 2016/0232538 A1 | 8/2016 | Papakostas et al. | |
| 2017/0364949 A1 | 12/2017 | Vandusen et al. | |
| 2023/0006897 A1 | 1/2023 | Papakostas et al. | |

FOREIGN PATENT DOCUMENTS

| | | | |
|---|---|---|---|
| CN | 111159514 A | * | 5/2020 |
| JP | 2020197929 | * | 12/2020 |
| WO | 2014143969 A2 | | 9/2014 |

OTHER PUBLICATIONS

United States Patent and Trademark Office, "Non-Final Office Action," in connection with U.S. Appl. No. 17/364,399, dated Apr. 14, 2022, 9 pages.

United States Patent and Trademark Office, "Non-Final Office Action," in connection with U.S. Appl. No. 18/166,900, mailed Mar. 11, 2024, 10 pages.

* cited by examiner

300

| | 302 | 304 | 306 | 308 |
|---|---|---|---|---|
| | TimeStamp | Host | Status | Total Response Time |
| 310 | 2019-10-24 17:14:25 +0000 | GET http://zillow.com/ HTTP/1.1 | 301 | 100840 |
| 312 | 2019-10-24 17:14:25 +0000 | CONNECT itunes.apple.com:443 HTTP/1.1 | 200 | 40145049 |
| 314 | 2019-10-24 17:14:25 +0000 | CONNECT www.zillow.com:443 HTTP/1.1 | 200 | 24434475 |
| 316 | 2019-10-24 17:14:26 +0000 | CONNECT sb.scorecardresearch.com:443 HTTP/1.1 | 200 | 22424045 |
| 318 | 2019-10-24 17:14:26 +0000 | CONNECT s.zillowstatic.com:443 HTTP/1.1 | 200 | 23177267 |
| 320 | 2019-10-24 17:14:26 +0000 | CONNECT smartlock.google.com:443 HTTP/1.1 | 200 | 1715539 |
| 322 | 2019-10-24 17:14:26 +0000 | CONNECT fonts.gstatic.com:443 HTTP/1.1 | 200 | 990500 |
| 324 | 2019-10-24 17:14:26 +0000 | CONNECT www.zillowstatic.com:443 HTTP/1.1 | 200 | 34141336 |
| 326 | 2019-10-24 17:14:26 +0000 | CONNECT www.zillowstatic.com:443 HTTP/1.1 | 200 | 901456 |
| 328 | 2019-10-24 17:14:27 +0000 | CONNECT e.zg-api.com:443 HTTP/1.1 | 200 | 83347771 |
| 330 | 2019-10-24 17:14:27 +0000 | CONNECT e.zg-api.com:443 HTTP/1.1 | 200 | 109906702 |
| 332 | 2019-10-24 17:14:27 +0000 | CONNECT pt.ispot.tv:443 HTTP/1.1 | 200 | 21361908 |
| 334 | 2019-10-24 17:14:27 +0000 | CONNECT www.zillow.com:443 HTTP/1.1 | 200 | 20086776 |
| 336 | 2019-10-24 17:14:27 +0000 | CONNECT static.ads-twitter.com:443 HTTP/1.1 | 200 | 22317296 |
| 338 | 2019-10-24 17:14:28 +0000 | CONNECT resources.xg4ken.com:443 HTTP/1.1 | 200 | 359238 |
| 340 | 2019-10-24 17:14:28 +0000 | CONNECT s.tribalfusion.com:443 HTTP/1.1 | 200 | 40237664 |
| 342 | 2019-10-24 17:14:28 +0000 | CONNECT usermatch.krxd.net:443 HTTP/1.1 | 200 | 69859671 |
| 344 | 2019-10-24 17:14:28 +0000 | CONNECT beacon.krxd.net:443 HTTP/1.1 | 200 | 70220651 |
| 346 | 2019-10-24 17:14:28 +0000 | CONNECT t.co:443 HTTP/1.1 | 200 | 21585683 |
| 348 | 2019-10-24 17:14:28 +0000 | CONNECT analytics.twitter.com:443 HTTP/1.1 | 200 | 21632340 |
| 350 | 2019-10-24 17:14:28 +0000 | CONNECT 4704202.fls.doubleclick.net:443 HTTP/1.1 | 200 | 21778939 |

FIG. 3

| Timestamp | Host | Status | Total Response Time |
|---|---|---|---|
| 2019-10-31 20:31:19 +0000 | CONNECT oauthaccountmanager.googleapis.com:443 HTTP/1.1 | 200 | 675425 |
| 2019-10-31 20:31:19 +0000 | CONNECT oauthaccountmanager.googleapis.com:443 HTTP/1.1 | 200 | 678647 |
| 2019-10-31 20:31:19 +0000 | CONNECT oauthaccountmanager.googleapis.com:443 HTTP/1.1 | 200 | 685623 |
| 2019-10-31 20:31:20 +0000 | CONNECT people-pa.googleapis.com:443 HTTP/1.1 | 200 | 215897 |
| 2019-10-31 20:31:20 +0000 | CONNECT people-pa.googleapis.com:443 HTTP/1.1 | 200 | 231132 |
| 2019-10-31 20:31:20 +0000 | CONNECT people-pa.googleapis.com:443 HTTP/1.1 | 200 | 431823 |
| 2019-10-31 20:31:20 +0000 | CONNECT lh3.googleusercontent.com:443 HTTP/1.1 | 200 | 248873 |
| 2019-10-31 20:31:20 +0000 | CONNECT lh3.googleusercontent.com:443 HTTP/1.1 | 200 | 268188 |
| 2019-10-31 20:31:20 +0000 | CONNECT lh3.googleusercontent.com:443 HTTP/1.1 | 200 | 261883 |
| 2019-10-31 20:31:20 +0000 | CONNECT lh3.googleusercontent.com:443 HTTP/1.1 | 200 | 375438 |
| 2019-10-31 20:31:20 +0000 | CONNECT lh3.googleusercontent.com:443 HTTP/1.1 | 200 | 461254 |
| 2019-10-31 20:31:20 +0000 | CONNECT www.mycreditcard.mobi:443 HTTP/1.1 | 200 | 1736468 |
| 2019-10-31 20:31:20 +0000 | CONNECT chromefeedcontentsuggestions-pa.googleapis.com:443 HTTP/1.1 | 200 | 1382130 |
| 2019-10-31 20:31:20 +0000 | CONNECT update.googleapis.com:443 HTTP/1.1 | 200 | 311884 |
| 2019-10-31 20:31:20 +0000 | CONNECT clientservices.googleapis.com:443 HTTP/1.1 | 200 | 233106 |
| 2019-10-31 20:31:21 +0000 | CONNECT lh4.googleusercontent.com:443 HTTP/1.1 | 200 | 386388 |
| 2019-10-31 20:31:21 +0000 | CONNECT www.mycreditcard.mobi:443 HTTP/1.1 | 200 | 185955 |
| 2019-10-31 20:31:21 +0000 | CONNECT mpsnare.iesnare.com:443 HTTP/1.1 | 200 | 388382 |
| 2019-10-31 20:31:21 +0000 | CONNECT www.mycreditcard.mobi:443 HTTP/1.1 | 200 | 461848 |
| 2019-10-31 20:31:21 +0000 | CONNECT www.mycreditcard.mobi:443 HTTP/1.1 | 200 | 397806 |
| 2019-10-31 20:31:22 +0000 | CONNECT cm.everesttech.net:443 HTTP/1.1 | 200 | 345121 |
| 2019-10-31 20:31:22 +0000 | CONNECT dpm.demdex.net:443 HTTP/1.1 | 200 | 702088 |
| 2019-10-31 20:31:22 +0000 | CONNECT syf.demdex.net:443 HTTP/1.1 | 200 | 187387 |

| Timestamp | Host | Status | Total Response Time |
|---|---|---|---|
| 2019-10-24 18:22:02 +0000 | CONNECT p41-buy.itunes.apple.com:443 HTTP/1.1 | 200 | 248070 |
| 2019-10-24 18:22:02 +0000 | CONNECT i.ytimg.com:443 HTTP/1.1 | 200 | 273310 |
| 2019-10-24 18:22:02 +0000 | CONNECT yt3.ggpht.com:443 HTTP/1.1 | 200 | 238753 |
| 2019-10-24 18:22:02 +0000 | CONNECT youtubei.googleapis.com:443 HTTP/1.1 | 200 | 150129367 |
| 2019-10-24 18:22:04 +0000 | CONNECT r2--sn-o4femez.googlevideo.com:443 HTTP/1.1 | 200 | 224718544 |

FIG. 5

| | Timestamp (674) | Host (604) | Status | Total Response Time |
|---|---|---|---|---|
| 602 | 2019-10-31 20:32:03 +0000 | CONNECT www.cnn.com:443 HTTP/1.1 | 200 | 1075253 |
| 606 | 2019-10-31 20:32:03 +0000 | CONNECT cdn.cnn.com:443 HTTP/1.1 | 200 | 1047015 |
| 608 | 2019-10-31 20:32:03 +0000 | CONNECT amplifypixel.outbrain.com:443 HTTP/1.1 | 200 | 9260172 |
| 610 | 2019-10-31 20:32:03 +0000 | CONNECT cdn3.optimizely.com:443 HTTP/1.1 | 200 | 3018674 |
| 612 | 2019-10-31 20:32:03 +0000 | CONNECT static.yieldmo.com:443 HTTP/1.1 | 200 | 14862987 |
| 614 | 2019-10-31 20:32:03 +0000 | CONNECT dpm.demdex.net:443 HTTP/1.1 | 200 | 14300233 |
| 616 | 2019-10-31 20:32:03 +0000 | CONNECT a125375638.cdn.optimizely.com:443 HTTP/1.1 | 200 | 42034174 |
| 618 620 622 | 2019-10-31 20:32:04 +0000 | GET http://ocsp.digicert.com/MFYwVKADAgEAME0wSzBJMAk GBSsOAwIaBQAEFOe8Aj%2Bc3j2o8MjapNC1%2BQvGO 8Q8BSjneYf%2Bdo5T8Bu6JHLIaXaMelKmwlQA45uDxd7Es Ige2no2GnLAg%3D%3D HTTP/1.1 | 200 | 178564 |
| 624 | 2019-10-31 20:32:04 +0000 | CONNECT logx.optimizely.com:443 HTTP/1.1 | 200 | 1853955 |
| 626 | 2019-10-31 20:32:04 +0000 | CONNECT code.jquery.com:443 HTTP/1.1 | 200 | 12188871 |
| 628 | 2019-10-31 20:32:04 +0000 | CONNECT sb.scorecardresearch.com:443 HTTP/1.1 | 200 | 14453889 |
| 630 | 2019-10-31 20:32:04 +0000 | CONNECT widgets.outbrain.com:443 HTTP/1.1 | 200 | 14855208 |
| 632 | 2019-10-31 20:32:04 +0000 | CONNECT s.amazon-adsystem.com:443 HTTP/1.1 | 200 | 17011898 |
| 634 | 2019-10-31 20:32:05 +0000 | CONNECT fastlane.rubiconproject.com:443 HTTP/1.1 | 0 | 0 |
| 636 | 2019-10-31 20:32:05 +0000 | CONNECT ib.adnxs.com:443 HTTP/1.1 | 0 | 0 |
| 638 | 2019-10-31 20:32:05 +0000 | CONNECT logx.optimizely.com:443 HTTP/1.1 | 200 | 787529 |
| 640 | 2019-10-31 20:32:05 +0000 | CONNECT pixel.adsafeprotected.com:443 HTTP/1.1 | 200 | 10852602 |
| 642 | 2019-10-31 20:32:05 +0000 | CONNECT s.cdn.turner.com:443 HTTP/1.1 | 200 | 1025380 |
| 644 | 2019-10-31 20:32:05 +0000 | CONNECT secure-us.imrworldwide.com:443 HTTP/1.1 | 200 | 72138970 |
| 646 | 2019-10-31 20:32:06 +0000 | GET http://ocsp.digicert.com/MFYwVKADAgEAME0wSzBJMAk GBSsOAwIaBQAEFOe8Aj%2Bc3j2o8MjapNC1%2BQvGO 8Q8BSjneYf%2Bdo5T8Bu6JHLIaXaMelKmwlQA1sTUY7ed VVJ4zCAO%2B7wdQ%3D%3D HTTP/1.1 | 200 | 49871 |
| 648 | 2019-10-31 20:32:06 +0000 | CONNECT om.everestech.net:443 HTTP/1.1 | 200 | 11523310 |
| 650 | 2019-10-31 20:32:06 +0000 | CONNECT as-sec.casalemedia.com:443 HTTP/1.1 | 200 | 6781240 |
| 652 | 2019-10-31 20:32:06 +0000 | CONNECT turner2.demdex.net:443 HTTP/1.1 | 200 | 11428275 |
| 654 | 2019-10-31 20:32:06 +0000 | CONNECT dpm.demdex.net:443 HTTP/1.1 | 200 | 396580 |
| 656 | 2019-10-31 20:32:06 +0000 | CONNECT smetrics.cnn.com:443 HTTP/1.1 | 200 | 11704063 |
| 658 | 2019-10-31 20:32:06 +0000 | CONNECT static.yieldmo.com:443 HTTP/1.1 | 200 | 12367171 |
| 660 | 2019-10-31 20:32:06 +0000 | CONNECT w.usabilla.com:443 HTTP/1.1 | 200 | 86510148 |
| 662 | 2019-10-31 20:32:06 +0000 | CONNECT mid.rkdms.com:443 HTTP/1.1 | 200 | 71332781 |
| 664 | 2019-10-31 20:32:07 +0000 | CONNECT log.outbrainimg.com:443 HTTP/1.1 | 200 | 411850 |
| 666 | 2019-10-31 20:32:07 +0000 | CONNECT consumer.krxd.net:443 HTTP/1.1 | 200 | 442245 |
| 668 | 2019-10-31 20:32:07 +0000 | CONNECT as-sec.casalemedia.com:443 HTTP/1.1 | 200 | 8202985 |
| 670 | 2019-10-31 20:32:07 +0000 | CONNECT dynaimage.cdn.cnn.com:443 HTTP/1.1 | 200 | 46564788 |
| 672 | 2019-10-31 20:32:07 +0000 | CONNECT icheck.outbrainimg.com:443 HTTP/1.1 | 200 | 18113984 |

| | 726 | 724 | | | 702 |
|---|---|---|---|---|---|
| | Is Foreground | Timestamp | Host | Status | Total Response Time |
| 706 | 1 | 2019-11-11 17:45:47 +0000 | CONNECT calendar.google.com:443 HTTP/1.1 | 200 | 6447 |
| 708 | 1 | 2019-11-11 17:45:47 +0000 | CONNECT calendar.google.com:443 HTTP/1.1 | 200 | 6497 |
| 710 | 1 | 2019-11-11 17:47:38 +0000 | CONNECT www.googleapis.com:443 HTTP/1.1 | 200 | 6871 |
| 712 | 0 | 2019-11-11 17:48:03 +0000 | CONNECT api.weather.com:443 HTTP/1.1 | 200 | 8998 |
| 714 | 0 | 2019-11-11 17:48:08 +0000 | CONNECT gateway.icloud.com:443 HTTP/1.1 | 200 | 5542 |
| 716 | 0 | 2019-11-11 17:56:28 +0000 | CONNECT images.sardlytics.com:443 HTTP/1.1 | 200 | 6680 |
| | During this time there were 200+ web traffic that were all background. This can be eliminated in crediting. | | | | |
| 718 | 0 | 2019-11-11 17:56:27 +0000 | CONNECT mservice.bankofamerica.com:443 HTTP/1.1 | 200 | 6681 |
| 720 | 1 | 2019-11-11 17:57:52 +0000 | CONNECT inbox.google.com:443 HTTP/1.1 | 200 | 7731 |
| 722 | 1 | 2019-11-11 17:57:52 +0000 | CONNECT safebrowsing.googleapis.com:443 HTTP/1.1 | 200 | 1756 |
| 704 | 1 | 2019-11-11 17:58:20 +0000 | CONNECT inbox.google.com:443 HTTP/1.1 | 200 | 51859 |

FIG. 7

METHODS AND APPARATUS TO IDENTIFY MAIN PAGE VIEWS

RELATED APPLICATION

This patent claims the benefit of U.S. Provisional Patent Application No. 63/295,438, which was filed on Dec. 30, 2021. U.S. Provisional Patent Application No. 63/295,438 is hereby incorporated herein by reference in its entirety. Priority to U.S. Provisional Patent Application No. 63/295,438 is hereby claimed.

FIELD OF THE DISCLOSURE

This disclosure relates generally to data collection and, more particularly, to methods and apparatus to identify main page views.

BACKGROUND

Web content can be delivered to and presented by a wide variety of content presentation devices such as desktop computers, laptop computers, tablet computers, personal digital assistants, smartphones, etc. Because a significant portion of web content is presented to such devices, monitoring of web content can provide valuable information to advertisers, content providers, and the like.

BRIEF DESCRIPTION OF THE DRAWINGS

FIGS. 3-7 illustrate example data collections that can be implemented in examples disclosed herein.

Figure 1:
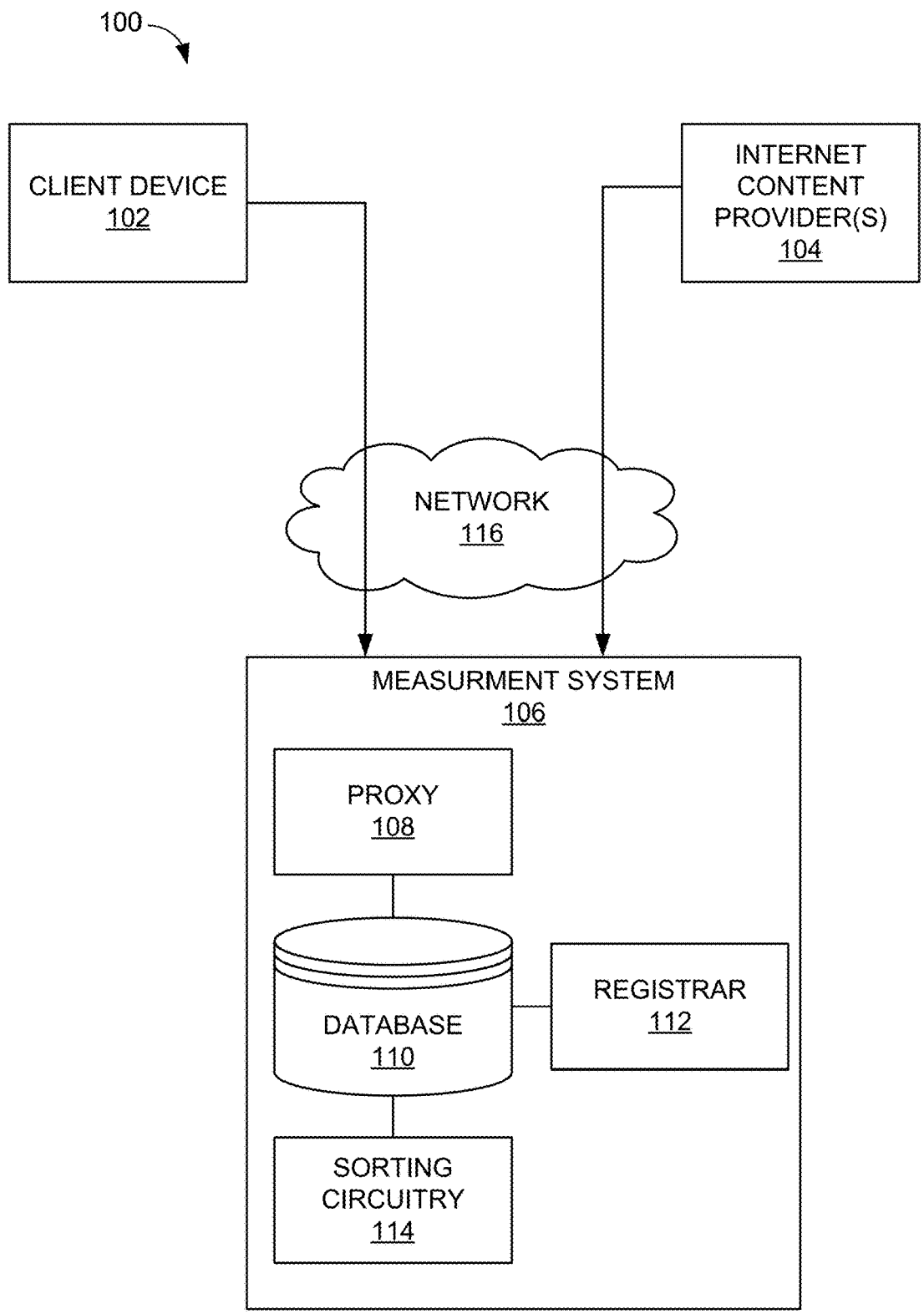
FIG. 1 illustrates an example environment in which examples disclosed herein can be implemented.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

Methods and apparatus to identify main page views are disclosed. Web content can be delivered to and presented by a wide variety of content presentation devices. This web content can be analyzed to determine web activity. For example, audience measurement companies want to monitor Internet traffic to and/or from client devices to, among other things, monitor exposure to advertisements, determine advertisement effectiveness, determine user behavior, identify purchasing behavior associated with various demographics, credit application usage, etc. Some known systems have utilized a proxy server to monitor Internet content being transmitted to and from the monitored device. Other systems can utilize a Virtual Private Network (VPN) connection to monitor Internet content being transmitted to and from the monitored device.

Proxy servers relay requests for media (e.g., images, video, webpages, etc.) from a requesting device to a server and, in turn, relay a response from the server to the requesting device. In some examples, a request is associated with a particular application and has respective timestamps of when the request was sent by the requesting device. In some examples, client devices can be configured to route requests for media to (and/or through) a proxy server. Client devices commonly include multiple communication options such as, for example, a Wi-Fi radio, a cellular radio, etc. In some examples, the proxy settings of the communication options of the client device are configured separately. For example, a proxy auto configuration (PAC) file may be used to configure a Wi-Fi radio to utilize a first proxy server while a profile may be used to configure a cellular radio to utilize a second proxy server. Example systems, methods, and apparatus for configuring a client device to interact with a proxy are disclosed in U.S. patent application Ser. Nos. 14/928,610, 13/840,594, 13/840,543, each of which is hereby incorporated by reference in their entirety.

In some examples, requests received at the proxy server are attributable to application usage by a client device user and may be referred to as foreground requests. In other examples, requests received at the proxy server are automatically generated requests by client devices that are generated without input from a client device user (e.g., background requests). However, foreground and background requests may be mixed together, following one another closely in time, and may not be respectively designated as such (e.g., the request may not include a designation as either foreground or background). Thus, when crediting application usage, these background requests may be false positives of application usage by a client device user and may produce a distorted monitoring result.

Example systems, methods, and apparatus disclosed herein credit main page views of applications associated with hypertext transfer protocol (HTTP) messages received at a proxy server. In some examples, application traffic (e.g., traffic from an application such as, for example, Facebook and/or a browser such as, for example, Apple® Safari®) is analyzed to determine whether a request is a background request or a foreground request to credit applications with page views and/or presentation durations based on the foreground requests (e.g., to avoid crediting background requests). In some such examples, timestamps and application information of the request under analysis and of requests preceding and following the request under analysis are logged. In some such examples, a set of rules is applied to the timestamps and/or the application information to determine whether the request under analysis is a background request or a foreground request. In some such examples, requests determined to be foreground requests are tagged (e.g., provided, sent, etc.) for crediting. Additionally or alternatively, requests determined to be background requests are discarded from crediting.

Some known implementations for crediting main page views generate profiles for each website such that a monitoring entity can match the request to a profile. However, this approach often requires constant maintenance and updates as websites undergo changes and updates. Further, the embedded traffic can also alter the profile generation.

Examples disclosed herein enable accurate and computationally efficient determination of main pages (e.g., main websites, main web pages, primary pages, etc.). Examples disclosed herein can identify main pages and/or main page requests from extracted and/or parsed uniform resource identifiers (URIs) and/or uniform resource locators (URLs) that are captured in network traffic (e.g., web traffic). Examples disclosed herein also enable accurate determination of duration time for main page views. Examples disclosed herein can determine a main page view utilizing encrypted information (e.g., hostname, response codes, URI, URL, response time/size, etc.) that identifies the main page. Examples disclosed herein can credit a main page view while discarding embedded traffic (e.g., fonts, style sheets, ads, etc.) from crediting. Examples disclosed herein can accurately determine main page views from data obtained via a VPN connection.

As used herein, the terms "main URI," "main URL," "main webpage," and "main page" can refer to a primary page with sub-pages or URIs that are associated therewith. Accordingly, the terms "main URI," "main URL," "main webpage," and "main page" can refer to primary websites that call, refer to and/or direct traffic when accessed via a browser or other application.

FIG. 1 illustrates an example environment 100 in which examples disclosed herein can be implemented. The example environment 100 includes an example client device 102, example Internet content provider(s) 104, and an example measurement system 106. The example measurement system 106 includes an example proxy 108, an example database 110, an example registrar 112, and example sorting circuitry 114.

As shown in the example of FIG. 1, Internet traffic to and/or from the example client device 102 and the Internet content provider(s) 104 passes through the example proxy 108 of the example measurement system 106 via a network 116. The example measurement system 106 may thus monitor the Internet traffic between the example client device 102 and the Internet content provider(s) 104. In the illustrated example, the network 116 can correspond to any type and/or number of wired and/or wireless data networks, or any combination thereof. In some examples, the network can be communicatively coupled to a VPN.

The example client device 102 can be a smartphone, a laptop computer, a desktop computer, a tablet computer, a smart television, etc. In the illustrated example, the client device 102 communicates via a wireless interface. However, the example client device 102 may utilize any other type(s) of communication interface, for example, an Ethernet connection, a Bluetooth connection, a Wi-Fi connection, a cellular connection, etc.

In the illustrated example, the client device 102 is associated with a panelist participating in a monitoring service. Although the example system of FIG. 1 is a panelist-based system, non-panelist and/or hybrid panelist systems may alternatively be employed. In the panelist system of the illustrated example, demographic information is obtained from the user of the example client device 102 when the user joins and/or registers for the panel. The demographic information may be obtained from the user via a telephone interview, by having the user complete an online survey, etc. While in the illustrated example, the client device 102 is associated with a single panelist, the example client device 102 may alternatively be associated with more than one panelist. For example, a family may have a single client device that may be shared amongst multiple users.

The example Internet content provider(s) 104, which supply content to clients via the Internet, can be implemented by any number and/or type of Internet provider. For example, the Internet content provider(s) 104 may comprise a web server hosting webpages formatted as Hypertext Markup Language (HTML) content. Alternatively, the Internet content provider(s) may be an application server(s) providing application content (e.g., media, audio, video, etc.) to applications accessing Internet content. The application may be formatted as HTML, Extensible Markup Language (XML), or may use any other protocol or port to return content to the requester.

In the example of FIG. 1, the example registrar 112 receives registration information from the panelist and stores a record identifying the panelist and/or their respective client device 102. In the illustrated example, the received registration information can include demographic information. However, any other information may additionally or alternatively be collected. The registration information may include, for example, information identifying the model of the example client device 102 associated with the panelist, a unique identifier of the panelist and/or the client device 102, the age of the panelist, the gender of the panelist and/or any other information related to the panelist and/or the example client device 102.

In the illustrated example, the registration data is received by the example registrar 112 via an electronic interface (e.g., by a panelist entering data into a form at a website or answering survey questions at a website). However, the example registrar 112 may alternatively be implemented manually by a person or group of people collecting and entering the registration data into the example database 110. Upon receiving the registration data, the example registrar 112 creates a record associating the panelist ad device identifier information with the collected demographic information.

Upon receiving a request from the example client device 102, the example proxy 108 retrieves the requested Internet content from the Internet Content provider(s) 104. In order to identify the panelist associated with the request, communication to and/or from each specific panelist occurs over a uniquely assigned (e.g., dedicated) port. The example database 110 receives and stores identifiers associating a panelist with the example client device 102 from the example registrar 112. Additionally, the example database 110 receives and stores monitoring data from the example proxy 108. The monitoring data is associated with the corresponding panelist and/or client device via the port number used for the corresponding monitored Internet traffic. As further disclosed herein, the example sorting circuitry 114 of the illustrated example of FIG. 1 credits application and/or browser usage to the panelist and/or client device 102 based on the requests received by the example proxy 108 and/or requests received via a VPN connection.

Figure 2:
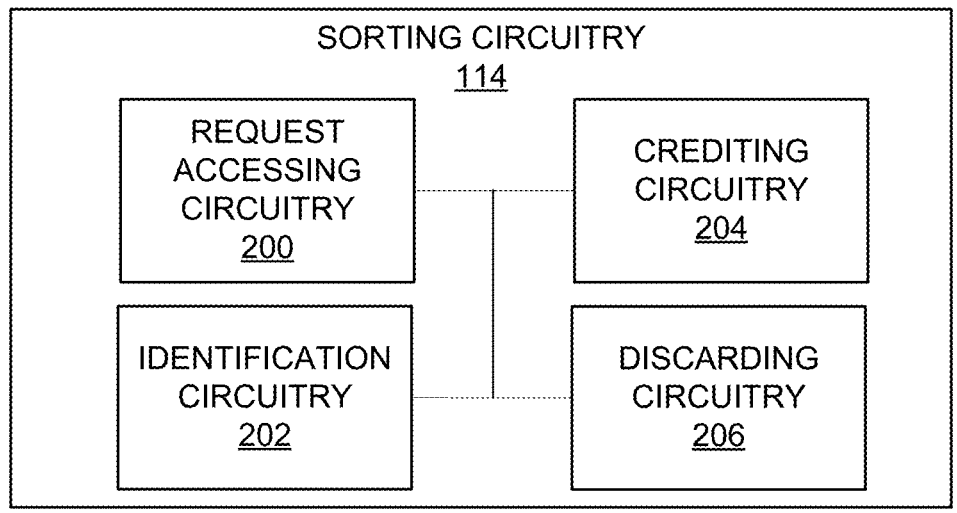
FIG. 2 is a block diagram of example sorting circuitry of FIG. 1

FIG. 2 is a block diagram of the example sorting circuitry 114 to credit application and/or browser usage to the panelist and/or client device 102 based on the requests received by the example proxy 108 and/or via the VPN connection. The sorting circuitry 114 of FIG. 2 may be instantiated (e.g., creating an instance of, bring into being for any length of time, materialize, implement, etc.) by processor circuitry such as a central processing unit executing instructions. Additionally or alternatively, the sorting circuitry 114 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by microprocessor circuitry executing instructions to implement one or more virtual machines and/or containers.

The example sorting circuitry 114 includes example request accessing circuitry 200, example identification circuitry 202, example crediting circuitry 204, and example discarding circuitry 206. The example request accessing circuitry 200 can access (e.g., retrieve) a log of requests from the proxy 108. In some examples, the log of requests includes main page requests (e.g., foreground requests) and embedded page requests (e.g., background requests, background traffic, etc.). In some examples, the log of requests includes timestamps corresponding to the main page requests and the embedded page requests. In some examples, the request accessing circuitry 200 accesses multiple ones of the main page requests and the embedded page requests that occur at consecutive timestamps and/or same timestamps. In some examples, the request accessing circuitry 200 accesses the log of requests, wherein the log of requests includes response times corresponding to the requests. In some examples, the request accessing circuitry 200 accesses the log of requests, wherein the log of requests includes data sizes corresponding to the requests. In some examples, the request accessing circuitry 200 accesses the log of requests, wherein the log of requests includes status codes corresponding to the requests. In some examples, the request accessing circuitry 200 accesses the log of requests, wherein at least one of the main page requests includes a URL, the URL indicating the main page view. In some examples, the request accessing circuitry 200 access the log of requests via a VPN connection. In some examples, the request accessing circuitry 200 is instantiated by processor circuitry executing request accessing instructions and/or configured to perform operations such as those represented by the flowcharts of FIGS. 8 and 9.

In some examples, the sorting circuitry 114 includes means for accessing a log of requests. For example, the means for accessing may be implemented by request accessing circuitry 200. In some examples, the request accessing circuitry 200 may be instantiated by processor circuitry such as the example processor circuitry 1012 of FIG. 10. For instance, the request accessing circuitry 200 may be instantiated by the example microprocessor 1100 of FIG. 11 executing machine executable instructions such as those implemented by at least block 802 of FIG. 8. In some examples, the request accessing circuitry 200 may be instantiated by hardware logic circuitry, which may be implemented by an ASIC, XPU, or the FPGA circuitry 1200 of FIG. 12 structured to perform operations corresponding to the machine readable instructions. Additionally or alternatively, the request accessing circuitry 200 may be instantiated by any other combination of hardware, software, and/or firmware. For example, the request accessing circuitry 200 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example identification circuitry 202 identifies at least one of the main page requests associated with the time interval. In some examples, the identification circuitry 202 identifies at least one of the main page requests based on consecutive ones of the timestamps. In some examples, the time interval is 5 seconds. In some examples, the identification circuitry 202 identifies the main page request based on at least one of response time, data size, status code, URL, same ones of the timestamps, etc. For example, the identification circuitry 202 identifies the at least one of the main page requests as a main page view based on a response time of the at least one of the main page requests being greater than response times corresponding to the other page requests (e.g., embedded page requests). In some examples, the identification circuitry 202 identifies the at least one of the main page requests as a main page view based on a data size of the at least one of the main page requests being greater than data sizes corresponding to the embedded page requests. In some examples, the identification circuitry 202 identifies the at least one of the main page requests as a main page view based on a status code indicating a main page view. In other examples, the identification circuitry 202 identifies the at least one of the main page requests as a main page view based on a URL indicating a main page view. In some examples, when the log of requests is accessed via a VPN, the identification circuitry 202 can identify at least one of a main page view or an embedded page view for at least one of the main page requests based on a device lock status. For example, the identification circuitry 202 can identify the at least one of the main page requests as an embedded page request (e.g., an embedded page view) when the device is locked. However, the identification circuitry 202 can identify the at least one of the main page requests as a main page view when the device is unlocked. In some examples, the identification circuitry 202 is instantiated by processor circuitry executing identification instructions and/or configured to perform operations such as those represented by the flowcharts of FIGS. 8 and 9.

In some examples, the sorting circuitry 114 includes means for identifying at least one of the main page requests. For example, the means for identifying may be implemented by identification circuitry 202. In some examples, the identification circuitry 202 may be instantiated by processor circuitry such as the example processor circuitry 1012 of FIG. 10. For instance, the identification circuitry 202 may be instantiated by the example microprocessor 1100 of FIG. 11 executing machine executable instructions such as those implemented by at least block 804 of FIG. 8 and blocks 900, 902, 904, 906, 908, 910, 912 of FIG. 9. In some examples, the identification circuitry 202 may be instantiated by hardware logic circuitry, which may be implemented by an ASIC, XPU, or the FPGA circuitry 1200 of FIG. 12 structured to perform operations corresponding to the machine readable instructions. Additionally or alternatively, the identification circuitry 202 may be instantiated by any other combination of hardware, software, and/or firmware. For example, the identification circuitry 202 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example crediting circuitry 204 credits the at least one of the main page requests as the main page view. In some examples, the crediting circuitry 204 credits the at least one of the main page requests with a duration (e.g., time duration, presentation duration, etc.). In some examples, the crediting circuitry 204 credits the client device 102 for accessing the main page. In some examples, the crediting circuitry 204 can credit the at least one of the main page requests as the main page view when the device lock status (e.g., the device lock status of the device 102) is unlocked. In some examples, the crediting circuitry 204 is instantiated by processor circuitry executing crediting instructions and/or configured to perform operations such as those represented by the flowcharts of FIGS. 8 and 9.

In some examples, the sorting circuitry 114 includes means for crediting the at least one of the main page requests as the main page view. For example, the means for crediting may be implemented by crediting circuitry 204. In some examples, the crediting circuitry 204 may be instantiated by processor circuitry such as the example processor circuitry 1012 of FIG. 10. For instance, the crediting circuitry 204 may be instantiated by the example microprocessor 1100 of FIG. 11 executing machine executable instructions such as those implemented by at least block 808 of FIG. 8. In some examples, the crediting circuitry 204 may be instantiated by hardware logic circuitry, which may be implemented by an ASIC, XPU, or the FPGA circuitry 1200 of FIG. 12 structured to perform operations corresponding to the machine readable instructions. Additionally or alternatively, the crediting circuitry 204 may be instantiated by any other combination of hardware, software, and/or firmware. For example, the crediting circuitry 204 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example discarding circuitry 206 discards (e.g., skips, removes, etc.) the embedded page requests from crediting. In some examples, the discarding circuitry 206 discards the embedded page requests based on known embedded URIs (e.g., known demons). For example, the discarding circuitry 206 can discard embedded page requests based on URIs including "www.gstatic.com", "static", "api" (except www-.googleapis.com), "www.googleadservices.com", "ads", "adserver", "adsafeprotected", "doubleclick", "cdn", "swcd", "SyncedDefaults", "dataTransport", "CloudKit", "analytics-ios", "MDM", "location", "passd", "geod", "itunesstored", "appstored", "trustd", "parsecd", "dataaccessed", "apsd", "assetsd", "crashlytics.com", "Server-bag", "MapsSupport", etc. In some examples, the discarding circuitry 206 discards embedded page requests that include at least one of the URIs "imrworldwide.com", "http://gist.github.com/pwnsdx/1217727ca57dedd2a372afdd7a0fc21", or "https://www.theiphonewiki.com/wiki/Services" from crediting. In some examples, the discarding circuitry 206 discards embedded page requests that include the URI ".facebook." from crediting. In some examples, the discarding circuitry 206 discards the at least one of the requests when the device lock status is locked. In some examples, the discarding circuitry 204 is instantiated by processor circuitry executing discarding instructions and/or configured to perform operations such as those represented by the flowcharts of FIGS. 8 and 9.

In some examples, the sorting circuitry 114 includes means for discarding embedded page requests from crediting. For example, the means for discarding may be implemented by discarding circuitry 206. In some examples, the discarding circuitry 206 may be instantiated by processor circuitry such as the example processor circuitry 1012 of FIG. 10. For instance, the discarding circuitry 206 may be instantiated by the example microprocessor 1100 of FIG. 11 executing machine executable instructions such as those implemented by at least blocks 806 of FIG. 8. In some examples, the discarding circuitry 206 may be instantiated by hardware logic circuitry, which may be implemented by an ASIC, XPU, or the FPGA circuitry 1200 of FIG. 12 structured to perform operations corresponding to the machine readable instructions. Additionally or alternatively, the discarding circuitry 206 may be instantiated by any other combination of hardware, software, and/or firmware. For example, the discarding circuitry 206 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

FIG. 3 illustrates example data 300 (e.g., data table, log, log of requests, etc.) stored in the example database 110 by the example proxy 108. The example data 300 includes an example timestamp column 302, an HTTP request (e.g., Host, URL, etc.) column 304, an example status code column 306, and an example response time column 308. In the illustrated example of FIG. 3, the example data table 300 includes data associated with a single device (e.g., the client device 102) and a single panelist. However, the example data table 300 stored in the database 110 by the example proxy 108 will include data associated with any number of different devices and/or any number of panelists. The example HTTP request column 304 is populated with HTTP traffic data (e.g., web page requests, foreground requests, background requests, URLs, URIs, etc.) showing the HTTP traffic. The example timestamp column 302 is populated with times of the occurrences of the corresponding HTTP traffic data. The example status code column 306 is populated with status codes (e.g., 301, 200, etc.) corresponding to the HTTP traffic data. The example response time column 308 includes response times (e.g., 100840, 40145049, etc.) corresponding to the requests.

The example data table 300 of FIG. 3 includes rows (e.g., requests) 310, 312, 314, 316, 318, 320, 322, 324, 326, 328, 330, 332, 334, 336, 338, 340, 342, 344, 346, 348, and 350. The row 310 includes a record that identifies that the client device 102 transmitted an HTTP request at 17:14:25+0000 on 2019, Oct. 24 for data from Zillow.com. The row 312 includes a record that identifies that the client device 102 transmitted an HTTP request at 17:14:25+0000 on 2019 Oct. 24 for data from itunes.apple.com. In some examples, first ones of the example records (e.g., the requests 310, 312, 314) are recorded at the same timestamp (e.g., 17:14:25+0000 on 2019 Oct. 24) associated with data from different websites and second ones of the records (e.g., requests 314, 316) are recorded at consecutive timestamps (e.g., 2019 Oct. 24 17:14:25+0000 and 2019 Oct. 24 17:14:26+0000) associated with data from different websites. As used herein, "consecutive timestamps" refer to timestamps in data that occur sequentially by second and/or simultaneously (e.g., at the same time).

The example request accessing circuitry 200 searches the database 110 and/or the proxy 108 for consecutive (e.g., consecutive and/or simultaneous) records of requests. In the example of FIG. 3, the example request accessing circuitry 200 accesses the example data 300. In this example, the data 300 includes the requests 310, 312, 314, 316, 318, 320, 322, 324, 326, 328, 330, 332, 334, 336, 338, 340, 342, 344, 346, 348, and 350 with corresponding timestamps that occur within 5 seconds. In other examples, the example request accessing circuitry 200 can access requests that occur within 6 seconds, 7 seconds, any number of seconds, etc. In some examples, consecutive requests can indicate that a user of the client device 102 sent a request for a main page that prompted the browser to generate multiple background requests in that same timestamp and/or in close (e.g., within 1 second) timestamps.

The example identification circuitry 202 identifies a main page request within the example data 300. In some examples, the example data 300 includes at least one main page request. In some examples, the identification circuitry 202 identifies the main page request based on at least one of response time, data size, status code, URL, etc. In the example of FIG. 3, the identification circuitry 202 identifies the main page view based on the status code "301" corresponding to the request 310. As such, the example identification circuitry 202 identifies the main page request as the request 310 for data from Zillow.com.

The example crediting circuitry 204 credits the request 310 with a main page view. In particular, the example crediting circuitry 204 credits the client device 102 with viewing Zillow.com based on the request 310. Thus, the client is likely to have requested the Zillow.com page initially and the following requests 312, 314, 316, 318, 320, 322, 324, 326, 328, 330, 332, 334, 336, 338, 340, 342, 344, 346, 348, and 350 were likely automatic requests (e.g., background requests) driven by the Zillow.com webpage. Accordingly, the example crediting circuitry 204 can credit the device 102 as viewing Zillow.com for the 5 second time interval (e.g., presentation duration).

In some examples, the discarding circuitry 206 can discard the embedded page requests from crediting. In some examples, the discarding circuitry 206 discards the background requests based on known embedded URIs. In the example of FIG. 3, the discarding circuitry 206 can discard requests that include "static" in the respective URIs. For example, URIs corresponding to the requests 318, 322, 324, 326, 336 include the term "static". Accordingly, the example discarding circuitry 206 can discard the requests 318, 322, 324, 326, 336 from crediting. Additionally or alternatively, the discarding circuitry 206 can discard requests that include "api" in the respective URIs. For example, URIs corresponding to the requests 328, 330 include the term "api". Accordingly, the example discarding circuitry 206 can discard the requests 328, 330 from crediting. The example discarding circuitry 206 can also discard requests that were not identified as a main page request from crediting. For example, the discarding circuitry 206 can discard the requests 312, 314, 316, 318, 320, 322, 324, 326, 328, 330, 332, 334, 336, 338, 340, 342, 344, 346, 348, and 350 from crediting.

FIG. 4 illustrates another example data table 400 stored in the example database 110 by the example proxy 108. The example data 400 of FIG. 4 is similar to the example data 300 of FIG. 3. However, the identification circuitry 202 identifies the main page request in the data 400 based on a response time size associated with the request. As used herein, "response time" refers to the time it takes to perform a HTTP GET and/or an HTTP CONNECT to the specified URL. In some examples, response time is calculated as the time to first byte, the time to receive headers, the time to load HTML of the site, the time it takes for a server to respond to a request, etc. In some examples, a duration of a response time can indicate a main page request because a main page request contains more data to load than an embedded page request. In the examples of FIGS. 3-7, response time is measured in milliseconds.

In the example of FIG. 4, the identification circuitry 202 identifies a largest (e.g., greatest, longest, etc.) one of the response times in response time column 402. Accordingly, the response time of request 404 (e.g., 1736468) is greater than ones of the response times of the requests 406, 408, 410, 412, 414, 416, 418, 420, 422, 424, 426, 428, 430, 432, 434, 436, 438, 440, 442, 444, 446, and 448. Thus, the identification circuitry 202 can identify the main page request as the request 404.

The example crediting circuitry 204 credits the request 404 with a main page view. In particular, the example crediting circuitry 204 credits the client device 102 with viewing www.mycreditcard.mobi based on the response time of the request 404. Thus, the client is likely to have requested the www.mycreditcard.mobi page initially and the requests 406, 408, 410, 412, 414, 416, 418, 420, 422, 424, 426, 428, 430, 432, 434, 436, 438, 440, 442, 444, 446, and 448 were likely automatic requests driven (e.g., prompted) by the www.mycreditcard.mobi webpage. In this example, an example timestamp column 450 in the data 400 indicates data collection for a time interval of 4 seconds. Accordingly, the example crediting circuitry 204 can credit the client device 102 as viewing www.mycreditcard.mobi for the 4 second time interval.

In some examples, the discarding circuitry 206 can discard the embedded page requests in the data 400 from crediting based on known embedded URIs. The example discarding circuitry 206 can also discard requests that were not identified as a main page view from crediting. For example, the discarding circuitry 206 can discard the requests 406, 408, 410, 412, 414, 416, 418, 420, 422, 424, 426, 428, 430, 432, 434, 436, 438, 440, 442, 444, 446, and 448 from crediting.

FIG. 5 illustrates another example data table 500 stored in the example database 110 by the example proxy 108. The example data 500 of FIG. 5 is similar to the example data 400 of FIG. 4. In particular, the example identification circuitry 202 identifies the main page request in the data 500 based on a response time size associated with the request. The example identification circuitry 202 identifies a largest one of the response times in response time column 502. Accordingly, the response time of request 504 (e.g., 224718544) is greater than ones of the response times of the requests 506, 508, 510, and 512. Thus, the identification circuitry 202 can identify the main page request as the request 504.

The example crediting circuitry 204 credits the request 504 with a main page view. In particular, the example crediting circuitry 204 credits the client device 102 with viewing r3-sn-q4flrnez.googlevideo.com based on the response time of the request 504. Thus, the client is likely to have requested the r3-sn-q4flrnez.googlevideo.com page initially and the requests 506, 508, 510, and 512 were likely automatic requests driven by the r3-sn-q4flrnez.googlevideo.com webpage. In this example, an example timestamp column 514 in the data 500 indicates data collection for a time interval of 3 seconds. Accordingly, the example crediting circuitry 204 can credit the client device 102 as viewing r3-sn-q4flrnez.googlevideo.com for the 3 second time interval.

In some examples, the discarding circuitry 206 can discard the embedded page requests in the data 500 from crediting based on known embedded URIs. The example discarding circuitry 206 can also discard requests that were not identified as a main page view from crediting. For example, the discarding circuitry 206 can discard the requests 506, 508, 510, and 512 from crediting.

FIG. 6 illustrates another example data 600 stored in the example database 110 by the example proxy 108. The example data 600 of FIG. 6 is similar to the example data 500 of FIG. 5. However, the example identification circuitry 202 identifies a main page request based on a URI and/or a URL associated with request 602 in HTTP column 604. In particular, the URI associated with the request 602 is www.cnn.com. In some examples, the client device 102 that requests a known webpage (e.g., www.cnn.com, www.fox.com, etc.) and/or a request that includes "www." is likely to indicate a main page request. As such, the example identification circuitry 202 identifies the request 602 as the main page request.

The example crediting circuitry 204 credits the request 602 with a main page view. In particular, the example crediting circuitry 204 credits the client device 102 with viewing www.cnn.com based on the URI of the request 602. Thus, the client is likely to have requested the www.cnn.com page initially and requests 606, 608, 610, 612, 614, 616, 618, 620, 622, 624, 626, 628, 630, 632, 634, 636, 638, 640, 642, 644, 646, 648, 650, 652, 654, 656, 658, 660, 662, 664, 666, 668, 670, and 672 were likely automatic requests driven by the www.cnn.com webpage. In this example, an example timestamp column 674 in the data 600 indicates data collection for a time interval of 5 seconds. Accordingly, the example crediting circuitry 204 can credit the client device 102 as viewing www.cnn.com for the 5 second time interval.

In some examples, the discarding circuitry 206 can discard the embedded page requests in the data 600 from crediting based on known embedded URIs. In the example of FIG. 6, the discarding circuitry 206 can discard requests that include "imrworldwide" in the respective URIs. For example, a URI corresponding to the request 644 includes the term "imrworldwide". Accordingly, the example discarding circuitry 206 can discard the request 644 from crediting. In some examples, request including occurrences of the term "imrworldwide" can be used for census reporting. The example discarding circuitry 206 can discard requests that include "static" in the respective URIs and/or URLs. For example, URIs corresponding to the requests 612, 568 include the term "static". Accordingly, the example discarding circuitry 206 can discard the requests 612, 568 from crediting. Further, the example discarding circuitry 206 can discard requests that were not identified as a main page view from crediting. For example, the discarding circuitry 206 can discard the requests 606, 608, 610, 612, 614, 616, 618, 620, 622, 624, 626, 628, 630, 632, 634, 636, 638, 640, 642, 644, 646, 648, 650, 652, 654, 656, 658, 660, 662, 664, 666, 668, 670, and 672 from crediting.

FIG. 7 illustrates another example data 700 stored in the example database 110 via a VPN connection. The example data 700 of FIG. 7 is similar to the example data 500 of FIG. 5. In particular, the example identification circuitry 202 identifies the main page request in the data 700 based on a response time size associated with the request. The example identification circuitry 202 identifies a largest one of the response times in response time column 702. Accordingly, the response time of request 704 (e.g., 51850) is greater than ones of the response times of requests 706, 708, 710, 712, 714, 716, 718, 720, 722. Thus, the identification circuitry 202 can identify the main page request as the request 704.

The example crediting circuitry 204 credits the request 704 with a main page view. In particular, the example crediting circuitry 204 credits the client device 102 with viewing inbox.google.com based on the response time of the request 704. Thus, the client is likely to have requested the inbox.google.com page initially and requests 706, 708, 710, 712, 714, 716, 718, 720, and 722 were likely automatic requests driven by the inbox.google.com webpage. In this example, an example timestamp column 724 in the data 700 indicates data collection for a time interval of 13 minutes. Accordingly, the example crediting circuitry 204 can credit the client device 102 as viewing inbox.google.com for the 13 minute time interval.

In the example of FIG. 7, the example data 700 includes an example lock status column 726. In this example, the request accessing circuitry 200 accesses the data 700 via a VPN connection. As such, the example identification circuitry 202 can sort (e.g., filter, analyze, etc.) the data 700 based on a device lock status. The example device lock status column 726 includes "1"s and "0"s, wherein "1" indicates that the client device 102 was "On" and/or "unlocked" and "0" indicates that the client device 102 was "Off" and/or "locked". For example, the request 704 includes a "1" in the respective device lock status column 726. Accordingly, the example client device 102 executed the request 704 for data from inbox.google.com when the client device 102 was "On". The example request 714 includes a "0" in the respective device lock status column 726. As such, the example client device 102 executed the request 714 for data from gateway.icloud.com when the client device 102 was "Off".

The example discarding circuitry 206 can discard requests including a "0" indicating the device lock status "Off". For requests including a status of "0", a user of the client device 102 is not likely requesting web pages because the client device 102 is powered off, the client device 102 is locked, the user is not using the client device 102, etc. As such, requests including a "0" in the device lock status column 726 are likely background requests. For example, the requests 712, 714, 716, and 718 include a "0" in the device lock status column 726. Accordingly, a user of the client device 102 did not likely initiate the requests 712, 714, 716, and 718 because the client device 102 was off, locked, etc. Thus, the example discarding circuitry 206 can discard the requests 712, 714, 716, and 718 from crediting. The example discarding circuitry 206 can also discard requests that include "api" in the respective URIs. For example, URIs corresponding to the requests 712, 722 include the term "api". Accordingly, the example discarding circuitry 206 can discard the requests 712, 722 from crediting. Further, the example discarding circuitry 206 can discard requests that were not identified as a main page view from crediting. For example, the discarding circuitry 206 can discard the requests 706, 708, 710, 712, 714, 716, 718, 720, and 722 from crediting.

While an example manner of implementing the sorting circuitry 114 of FIG. 1 is illustrated in FIG. 2, one or more of the elements, processes, and/or devices illustrated in FIG. 2 may be combined, divided, re-arranged, omitted, eliminated, and/or implemented in any other way. Further, the example request accessing circuitry 200, the example identification circuitry 202, the example crediting circuitry 204, the example discarding circuitry 206, and/or, more generally, the example sorting circuitry 114 of FIG. 1, may be implemented by hardware alone or by hardware in combination with software and/or firmware. Thus, for example, any of the example request accessing circuitry 200, the example identification circuitry 202, the example crediting circuitry 204, the example discarding circuitry 206 and/or, more generally, the example sorting circuitry 114, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example sorting circuitry 114 of FIG. 1 may include one or more elements, processes, and/or devices in addition to, or instead of, those illustrated in FIG. 2, and/or may include more than one of any or all of the illustrated elements, processes and devices.

Figure 8:
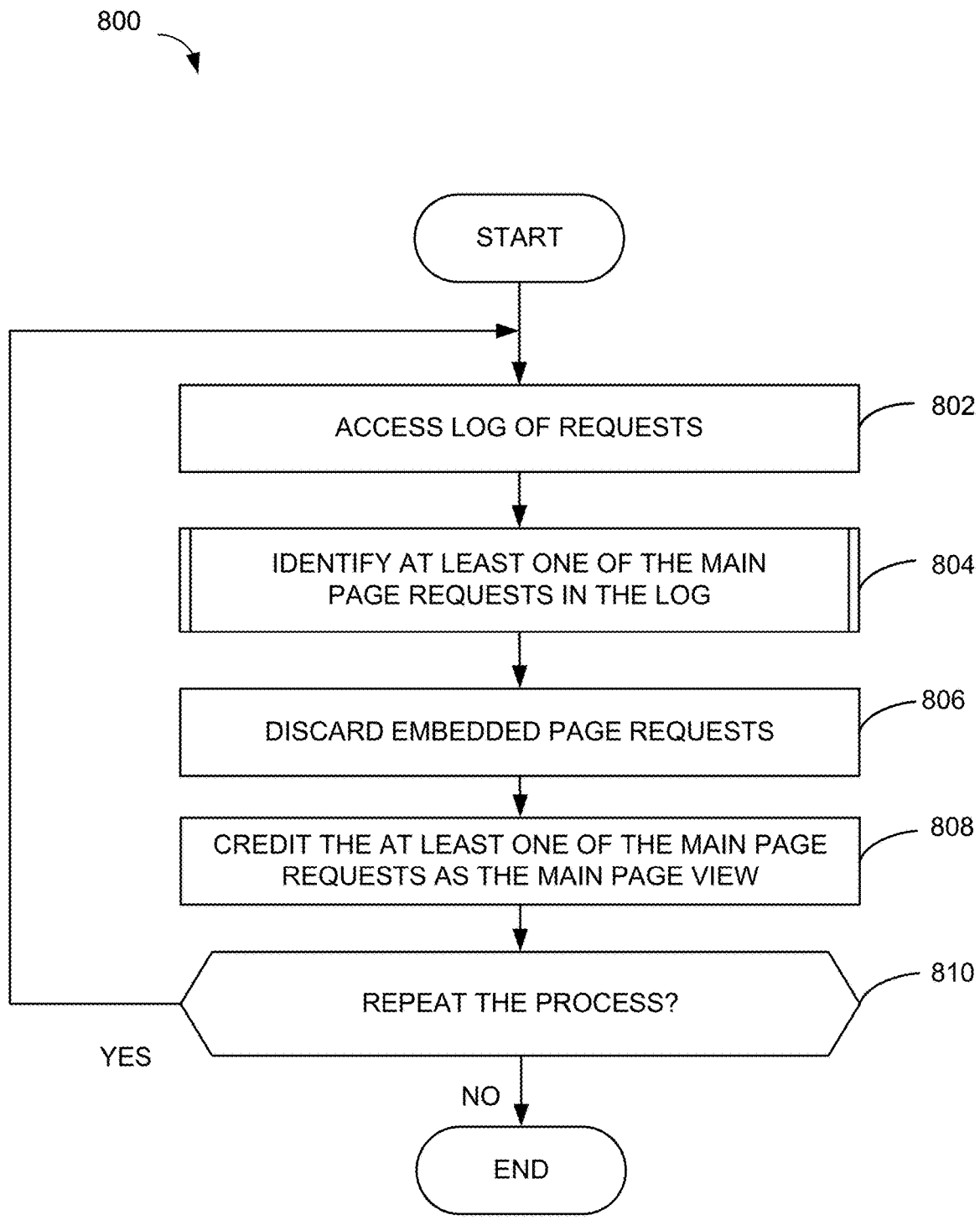
FIG. 8 is a flowchart representative of example machine readable instructions and/or example operations that may be executed by example processor circuitry to implement the sorting circuitry of FIG. 2.
Figure 9:
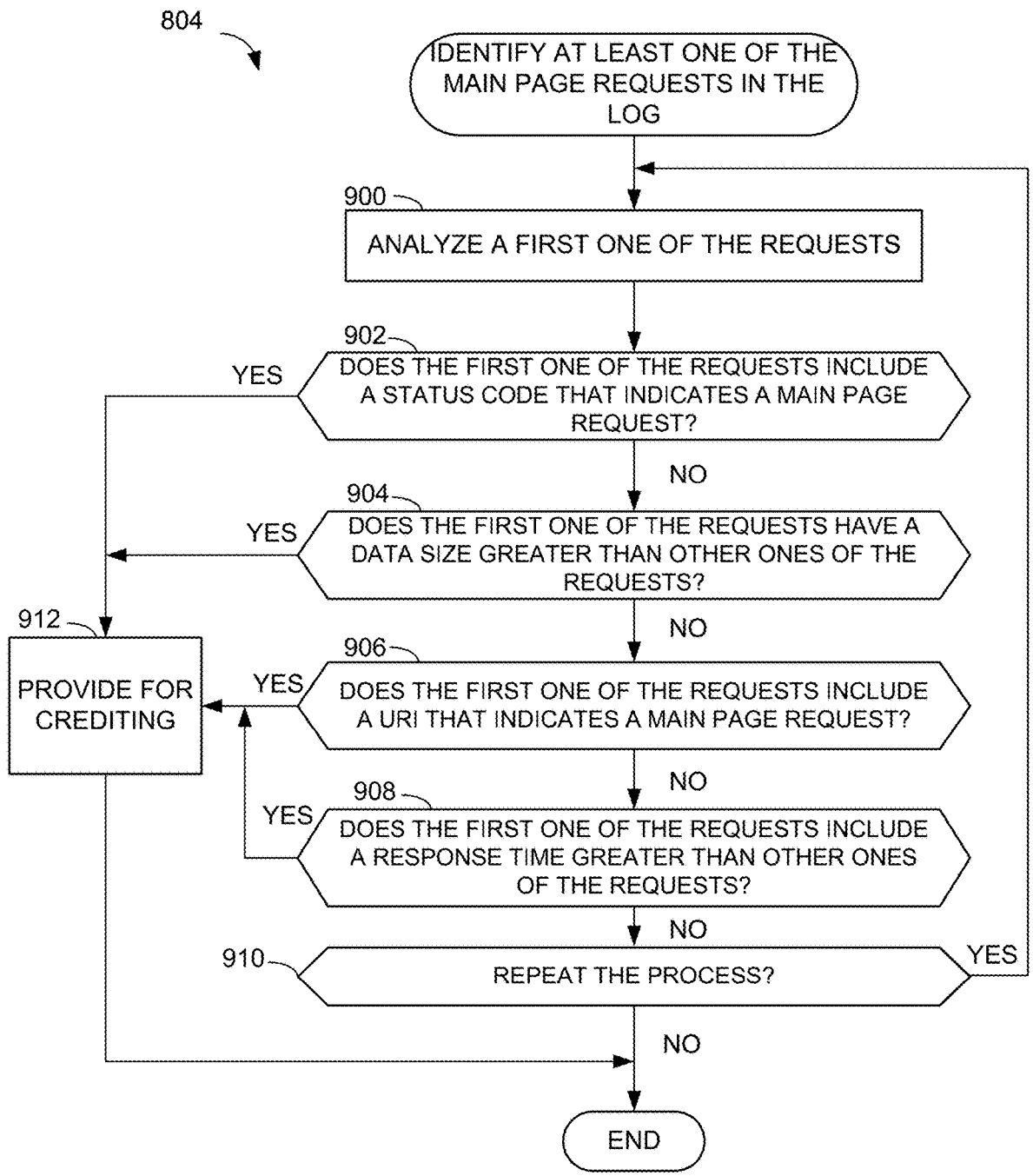
FIG. 9 is another example flowchart representative of example machine readable instructions and/or example operations that may be executed by example processor circuitry to implement the sorting circuitry of FIG. 2.

Flowcharts representative of example machine readable instructions, which may be executed to configure processor circuitry to implement the example sorting circuitry 114 of FIG. 2, is shown in FIGS. 8 and 9. The machine readable instructions may be one or more executable programs or portion(s) of an executable program for execution by processor circuitry, such as the processor circuitry 1012 shown in the example processor platform 1000 discussed below in connection with FIG. 10 and/or the example processor circuitry discussed below in connection with FIGS. 11 and/or 12. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 8 and 9, many other methods of implementing the example sorting circuitry 114 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 8 and 9 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 8 is a flowchart representative of example machine readable instructions and/or example operations 800 that may be executed and/or instantiated by processor circuitry to credit main page views. The machine readable instructions and/or the operations 800 of FIG. 8 begin at block 802, at which the request accessing circuitry 200 accesses a log of requests (e.g., the requests 310, 312, 314, 316, 318, 320, 322, 324, 326, 328, 330, 332, 334, 336, 338, 340, 342, 344, 346, 348, 350, etc.). In some examples, the request accessing circuitry 200 accesses a log of requests (e.g., the requests 704, 706, 708, 710, 712, 714, 716, 718, 720, 722, etc.) via a VPN connection with the client device 102 and/or from a proxy server (e.g., the proxy 108). In some examples, the log (e.g., the data 300, 400, 500, 600, 700, etc.) of requests includes main page requests and embedded page requests. In some examples, the request accessing circuitry 200 accesses timestamps (e.g., in the example timestamp column 302) corresponding to the main page requests and the embedded page requests. In some examples, the request accessing circuitry 200 accesses multiple ones of the main page requests and the embedded page requests that can occur at consecutive timestamps and/or same timestamps. In some examples, the request accessing circuitry 200 accesses the log of requests associated with a time interval (e.g., 5 seconds). In some examples, the request accessing circuitry 200 accesses the log of requests, wherein the log of requests includes response times (e.g., in the example response time column 308) corresponding to the requests. In some examples, the request accessing circuitry 200 accesses the log of requests, wherein the log of requests includes data sizes corresponding to the requests. In some examples, the request accessing circuitry 200 accesses the log of requests, wherein the log of requests includes status codes (e.g., in the example status code column 306) corresponding to the requests. In some examples, the request accessing circuitry 200 accesses the log of requests, wherein at least one of the main page requests includes a URL (e.g., in the example HTTP column 304), the URL indicating the main page view.

At block 804, the example identification circuitry 202 identifies at least one of the main page requests in the log of requests as a main page request, which is further described in connection with FIG. 9.

At block 806, the example discarding circuitry 206 discards the embedded page requests from crediting. In some examples, the discarding circuitry 206 discards the embedded page requests based on known embedded URIs. For example, the discarding circuitry 206 discards embedded page requests based on URIs including "www.gstatic.com", "static", "api.", etc. In some examples, the discarding circuitry 206 discards embedded page requests that include the URI "imrworldwide.com" from crediting. In some examples, the discarding circuitry 206 discards embedded page requests that include the URI ".facebook." from crediting. In some examples, the discarding circuitry 206 discards requests that include a locked device status (e.g., "0").

At block 808, the example crediting circuitry 204 credits the at least one of the main page requests (e.g., the request 310, the request 404, the request 504, the request 602, the request 704) as a main page view. In some examples, the crediting circuitry 204 credits the at least one of the main page requests with a duration (e.g., 5 seconds, 3 seconds, etc.). In some examples, the crediting circuitry 204 credits the client device 102 as accessing (e.g., viewing) the main page (e.g., Zillow.com, www.cnn.com, etc.). In some examples, the crediting circuitry 204 credits the at least one of the main page requests (e.g., the request 704) as the main page view if the device lock status (e.g., in the device lock status column 726) is unlocked (e.g., "1").

At block 810, the example sorting circuitry 114 determines whether to repeat the process. If the process is to be repeated (block 810), the process returns to block 802. Otherwise the process ends.

FIG. 9 is a flowchart representative of example machine readable instructions and/or example operations that may be executed and/or instantiated by processor circuitry to implement the example identification circuitry 202, as described above in connection with block 804 of FIG. 8. The machine readable instructions and/or the operations of FIG. 9 begin at block 900, at which the example identification circuitry 202 analyzes a first one of the requests.

At block 902, the example identification circuitry 202 determines whether the first one of the requests includes a status code that indicates a main page request. For example, the identification circuitry 202 can determine that a request that includes the status code "302" and/or "301" is a main page request (e.g., the request 310). If the example identification circuitry 202 determines that the first one of the requests includes a status code that indicates a main page request (block 902), then the process proceeds to block 912. Otherwise, the process proceeds to block 904.

At block 904, the example identification circuitry 202 determines whether the first one of the requests includes a data size greater than other ones of the requests. For example, the identification circuitry 202 can determine that the first one of the requests is a main page request when the first one of the requests has larger (e.g., greater, bigger, etc.) data size than other ones of the requests. If the example identification circuitry 202 determines that the first one of the requests has a larger data size than other ones of the requests, the process proceeds to block 912. Otherwise the process proceeds to block 906.

At block 906, the example identification circuitry 202 determines whether the first one of the requests includes a URI that indicates a main page request. For example, the identification circuitry 202 can determine that the first one of the requests that includes a known main page URI (e.g., www.cnn.com) is a main page request. If the example identification circuitry 202 determines that the first one of the requests includes a main page URI, then the process proceeds to block 912. Otherwise, the process proceeds to block 908.

At block 908, the example identification circuitry 202 determines whether the first one of the requests includes a response time greater than other ones of the requests. For example, the identification circuitry 202 can determine that the first one of the requests is a main page request when the first one of the requests has a greater response time than other ones of the requests. If the example identification circuitry 202 determines that the first one of the requests has a greater response time than other ones of the requests, the process proceeds to block 912. Otherwise the process proceeds to block 910.

At block 910, the example identification circuitry 202 determines whether to repeat the process. In some examples, the identification circuitry 202 determines that there are additional requests (e.g., in the data 300, 400, 500, 600, 700) to be processed. In such examples, the identification circuitry 202 repeats the process, and control of the process returns to block 900. In some examples, the identification circuitry 202 identifies that there are no additional requests to be processed. In such examples, the process ends.

At block 912, the example identification circuitry 202 provides the main page request for crediting. Then, the process ends.

Figure 10:
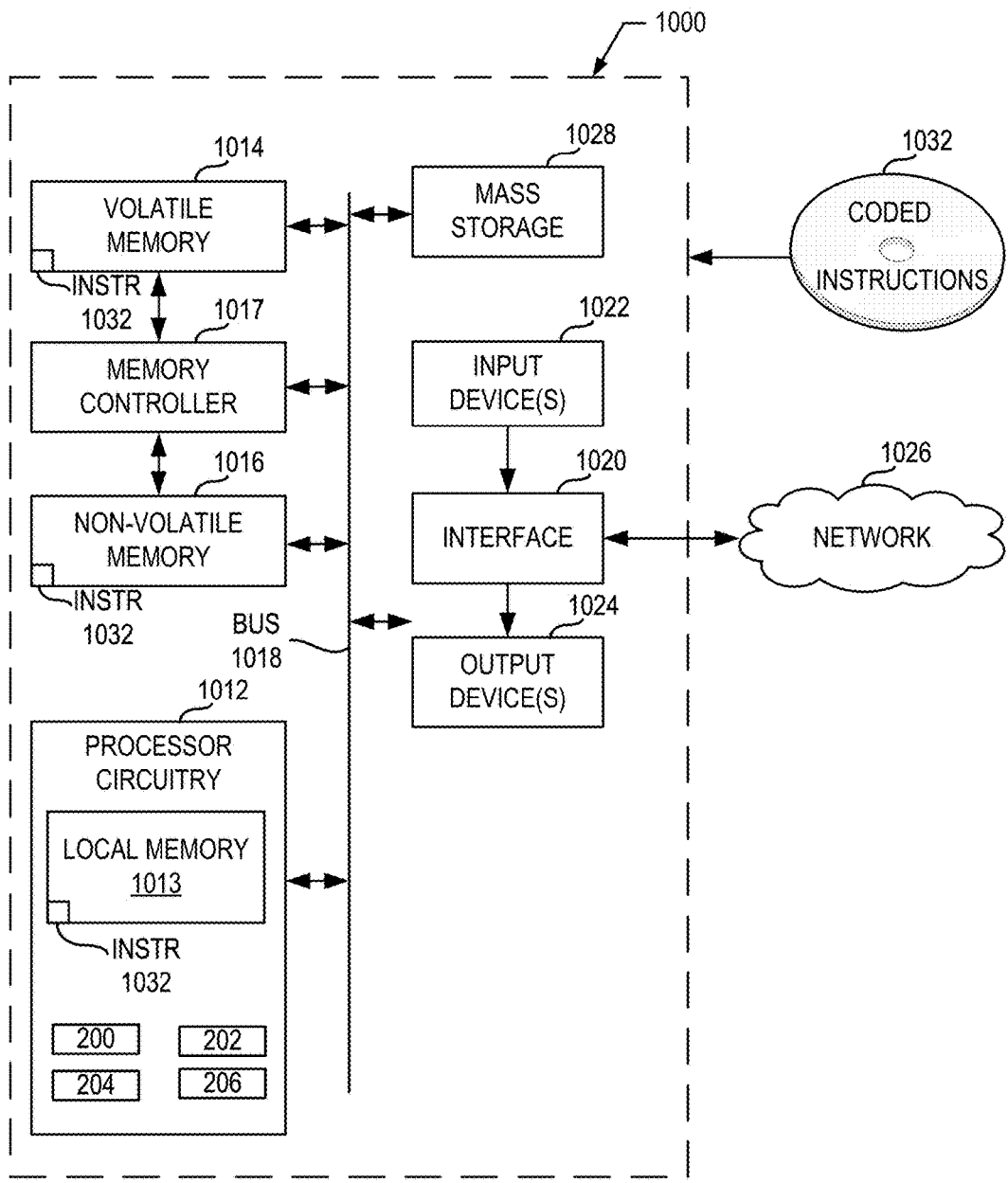
FIG. 10 is a block diagram of an example processing platform including processor circuitry structured to execute the example machine readable instructions and/or the example operations of FIGS. 8 and 9 to implement the sorting circuitry of FIG. 2.

FIG. 10 is a block diagram of an example processor platform 1000 structured to execute and/or instantiate the machine readable instructions and/or the operations of FIGS. 8 and 9 to implement the example sorting circuitry 114 of FIG. 2. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1000 of the illustrated example includes processor circuitry 1012. The processor circuitry 1012 of the illustrated example is hardware. For example, the processor circuitry 1012 can be implemented by one or more integrated circuits, logic circuits, FPGAs, microprocessors, CPUs, GPUs, DSPs, and/or microcontrollers from any desired family or manufacturer. The processor circuitry 1012 may be implemented by one or more semiconductor based (e.g., silicon based) devices. In this example, the processor circuitry 1012 implements the example request accessing circuitry 200, the example identification circuitry 202, the example crediting circuitry 204, and the example discarding circuitry 20.

The processor circuitry 1012 of the illustrated example includes a local memory 1013 (e.g., a cache, registers, etc.). The processor circuitry 1012 of the illustrated example is in communication with a main memory including a volatile memory 1014 and a non-volatile memory 1016 by a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1016 may be implemented by flash memory and/or any other desired type of memory device. Access to the main memory 1014, 1016 of the illustrated example is controlled by a memory controller 1017.

The processor platform 1000 of the illustrated example also includes interface circuitry 1020. The interface circuitry 1020 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1022 are connected to the interface circuitry 1020. The input device(s) 1022 permit(s) a user to enter data and/or commands into the processor circuitry 1012.

One or more output devices 1024 are also connected to the interface circuitry 1020 of the illustrated example. The interface circuitry 1020 of the illustrated example, thus, typically includes a graphics driver card, a graphics driver chip, and/or graphics processor circuitry such as a GPU.

The interface circuitry 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1026. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1000 of the illustrated example also includes one or more mass storage devices 1028 to store software and/or data. Examples of such mass storage devices 1028 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 1032, which may be implemented by the machine readable instructions of FIGS. 8 and 9, may be stored in the mass storage device 1028, in the volatile memory 1014, in the non-volatile memory 1016, and/or on a removable non-transitory computer readable storage medium such as a CD or DVD.

Figure 11:
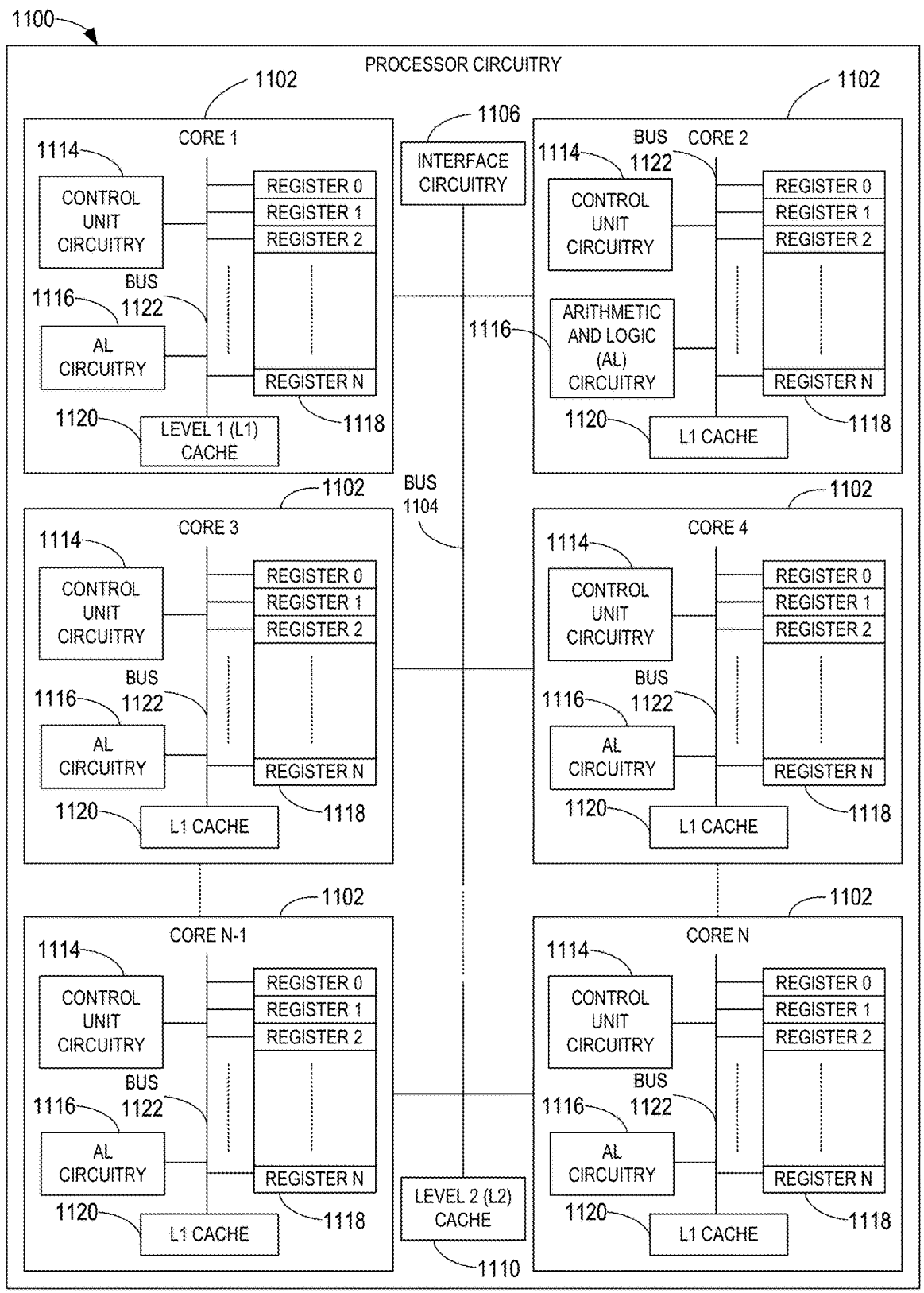
FIG. 11 is a block diagram of an example implementation of the processor circuitry of FIG. 10.

FIG. 11 is a block diagram of an example implementation of the processor circuitry 1012 of FIG. 10. In this example, the processor circuitry 1012 of FIG. 10 is implemented by a microprocessor 1100. For example, the microprocessor 1100 may be a general purpose microprocessor (e.g., general purpose microprocessor circuitry). The microprocessor 1100 executes some or all of the machine readable instructions of the flowcharts of FIGS. 8 and 9 to effectively instantiate the example sorting circuitry 114 of FIG. 2 as logic circuits to perform the operations corresponding to those machine readable instructions. In some such examples, the example sorting circuitry 114 of FIG. 2 is instantiated by the hardware circuits of the microprocessor 1100 in combination with the instructions. For example, the microprocessor 1100 may be implemented by multi-core hardware circuitry such as a CPU, a DSP, a GPU, an XPU, etc. Although it may include any number of example cores 1102 (e.g., 1 core), the microprocessor 1100 of this example is a multi-core semiconductor device including N cores. The cores 1102 of the microprocessor 1100 may operate independently or may cooperate to execute machine readable instructions. For example, machine code corresponding to a firmware program, an embedded software program, or a software program may be executed by one of the cores 1102 or may be executed by multiple ones of the cores 1102 at the same or different times. In some examples, the machine code corresponding to the firmware program, the embedded software program, or the software program is split into threads and executed in parallel by two or more of the cores 1102. The software program may correspond to a portion or all of the machine readable instructions and/or operations represented by the flowcharts of FIGS. 8 and 9.

The cores 1102 may communicate by a first example bus 1104. In some examples, the first bus 1104 may be implemented by a communication bus to effectuate communication associated with one(s) of the cores 1102. For example, the first bus 1104 may be implemented by at least one of an Inter-Integrated Circuit (I2C) bus, a Serial Peripheral Interface (SPI) bus, a PCI bus, or a PCIe bus. Additionally or alternatively, the first bus 1104 may be implemented by any other type of computing or electrical bus. The cores 1102 may obtain data, instructions, and/or signals from one or more external devices by example interface circuitry 1106. The cores 1102 may output data, instructions, and/or signals to the one or more external devices by the interface circuitry 1106. Although the cores 1102 of this example include example local memory 1120 (e.g., Level 1 (L1) cache that may be split into an L1 data cache and an L1 instruction cache), the microprocessor 1100 also includes example shared memory 1110 that may be shared by the cores (e.g., Level 2 (L2 cache)) for high-speed access to data and/or instructions. Data and/or instructions may be transferred (e.g., shared) by writing to and/or reading from the shared memory 1110. The local memory 1120 of each of the cores 1102 and the shared memory 1110 may be part of a hierarchy of storage devices including multiple levels of cache memory and the main memory (e.g., the main memory 1014, 1016 of FIG. 10). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1102 may be referred to as a CPU, DSP, GPU, etc., or any other type of hardware circuitry. Each core 1102 includes control unit circuitry 1114, arithmetic and logic (AL) circuitry (sometimes referred to as an ALU) 1116, a plurality of registers 1118, the local memory 1120, and a second example bus 1122. Other structures may be present. For example, each core 1102 may include vector unit circuitry, single instruction multiple data (SIMD) unit circuitry, load/store unit (LSU) circuitry, branch/jump unit circuitry, floating-point unit (FPU) circuitry, etc. The control unit circuitry 1114 includes semiconductor-based circuits structured to control (e.g., coordinate) data movement within the corresponding core 1102. The AL circuitry 1116 includes semiconductor-based circuits structured to perform one or more mathematic and/or logic operations on the data within the corresponding core 1102. The AL circuitry 1116 of some examples performs integer based operations. In other examples, the AL circuitry 1116 also performs floating point operations. In yet other examples, the AL circuitry 1116 may include first AL circuitry that performs integer based operations and second AL circuitry that performs floating point operations. In some examples, the AL circuitry 1116 may be referred to as an Arithmetic Logic Unit (ALU). The registers 1118 are semiconductor-based structures to store data and/or instructions such as results of one or more of the operations performed by the AL circuitry 1116 of the corresponding core 1102. For example, the registers 1118 may include vector register(s), SIMD register(s), general purpose register(s), flag register(s), segment register(s), machine specific register(s), instruction pointer register(s), control register(s), debug register(s), memory management register(s), machine check register(s), etc. The registers 1118 may be arranged in a bank as shown in FIG. 11. Alternatively, the registers 1118 may be organized in any other arrangement, format, or structure including distributed throughout the core 1102 to shorten access time. The second bus 1122 may be implemented by at least one of an I2C bus, a SPI bus, a PCI bus, or a PCIe bus Each core 1102 and/or, more generally, the microprocessor 1100 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1100 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 12:
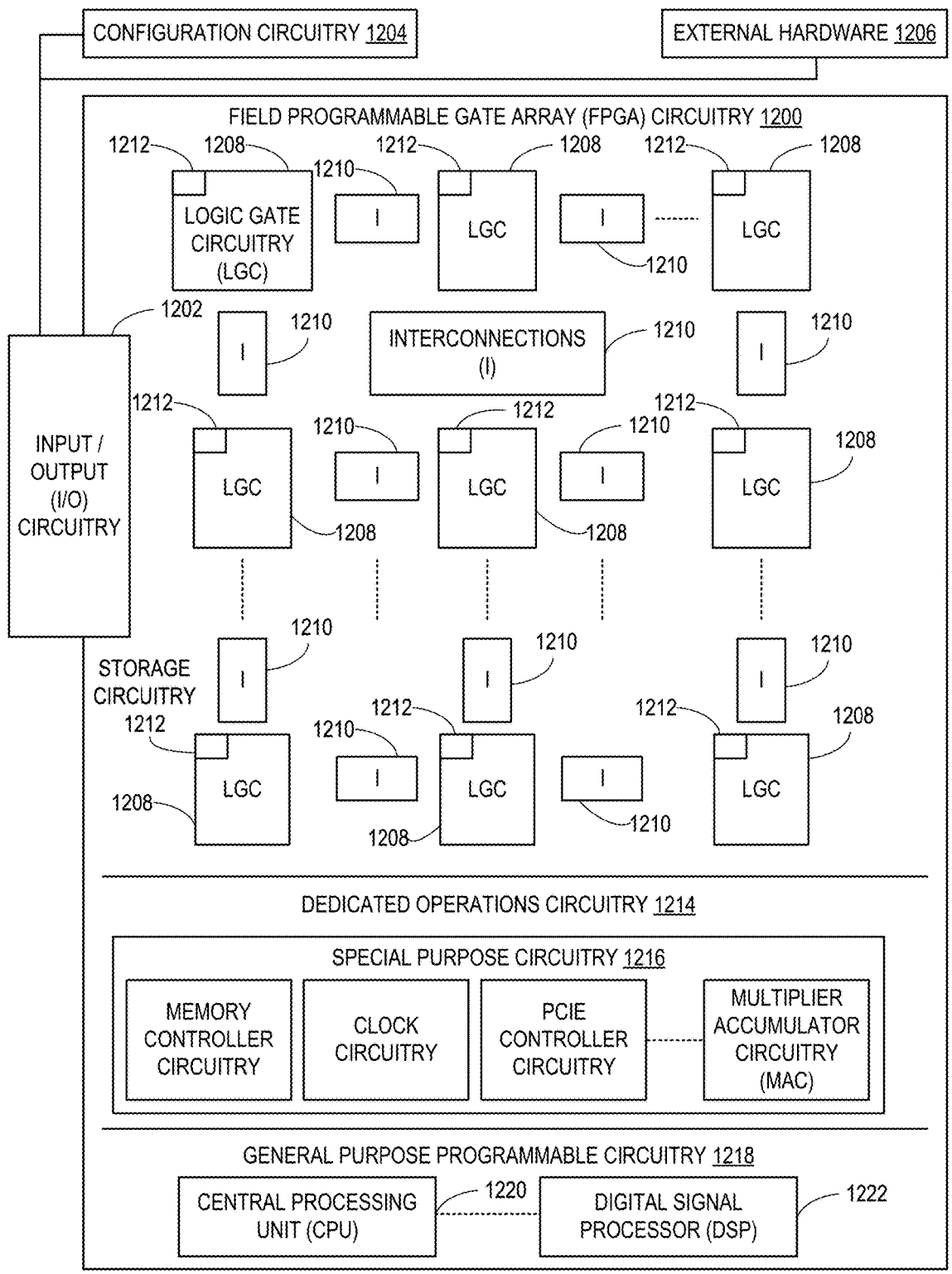
FIG. 12 is a block diagram of another example implementation of the processor circuitry of FIG. 10.

FIG. 12 is a block diagram of another example implementation of the processor circuitry 1012 of FIG. 10. In this example, the processor circuitry 1012 is implemented by FPGA circuitry 1200. For example, the FPGA circuitry 1200 may be implemented by an FPGA. The FPGA circuitry 1200 can be used, for example, to perform operations that could otherwise be performed by the example microprocessor 1100 of FIG. 11 executing corresponding machine readable instructions. However, once configured, the FPGA circuitry 1200 instantiates the machine readable instructions in hardware and, thus, can often execute the operations faster than they could be performed by a general purpose microprocessor executing the corresponding software.

More specifically, in contrast to the microprocessor 1100 of FIG. 11 described above (which is a general purpose device that may be programmed to execute some or all of the machine readable instructions represented by the flowcharts of FIGS. 8 and 9 but whose interconnections and logic circuitry are fixed once fabricated), the FPGA circuitry 1200 of the example of FIG. 12 includes interconnections and logic circuitry that may be configured and/or interconnected in different ways after fabrication to instantiate, for example, some or all of the machine readable instructions represented by the flowcharts of FIGS. 8 and 9. In particular, the FPGA circuitry 1200 may be thought of as an array of logic gates, interconnections, and switches. The switches can be programmed to change how the logic gates are interconnected by the interconnections, effectively forming one or more dedicated logic circuits (unless and until the FPGA circuitry 1200 is reprogrammed). The configured logic circuits enable the logic gates to cooperate in different ways to perform different operations on data received by input circuitry. Those operations may correspond to some or all of the software represented by the flowcharts of FIGS. 8 and 9. As such, the FPGA circuitry 1200 may be structured to effectively instantiate some or all of the machine readable instructions of the flowcharts of FIGS. 8 and 9 as dedicated logic circuits to perform the operations corresponding to those software instructions in a dedicated manner analogous to an ASIC. Therefore, the FPGA circuitry 1200 may perform the operations corresponding to the some or all of the machine readable instructions of FIGS. 8 and 0 faster than the general purpose microprocessor can execute the same.

In the example of FIG. 12, the FPGA circuitry 1200 is structured to be programmed (and/or reprogrammed one or more times) by an end user by a hardware description language (HDL) such as Verilog. The FPGA circuitry 1200 of FIG. 12, includes example input/output (I/O) circuitry 1202 to obtain and/or output data to/from example configuration circuitry 1204 and/or external hardware 1206. For example, the configuration circuitry 1204 may be implemented by interface circuitry that may obtain machine readable instructions to configure the FPGA circuitry 1200, or portion(s) thereof. In some such examples, the configuration circuitry 1204 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1206 may be implemented by external hardware circuitry. For example, the external hardware 1206 may be implemented by the microprocessor 1100 of FIG. 11. The FPGA circuitry 1200 also includes an array of example logic gate circuitry 1208, a plurality of example configurable interconnections 1210, and example storage circuitry 1212. The logic gate circuitry 1208 and the configurable interconnections 1210 are configurable to instantiate one or more operations that may correspond to at least some of the machine readable instructions of FIGS. 8 and 9 and/or other desired operations. The logic gate circuitry 1208 shown in FIG. 12 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1208 to enable configuration of the electrical structures and/or the logic gates to form circuits to perform desired operations. The logic gate circuitry 1208 may include other electrical structures such as look-up tables (LUTs), registers (e.g., flip-flops or latches), multiplexers, etc.

The configurable interconnections 1210 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1208 to program desired logic circuits.

The storage circuitry 1212 of the illustrated example is structured to store result(s) of the one or more of the operations performed by corresponding logic gates. The storage circuitry 1212 may be implemented by registers or the like. In the illustrated example, the storage circuitry 1212 is distributed amongst the logic gate circuitry 1208 to facilitate access and increase execution speed.

The example FPGA circuitry 1200 of FIG. 12 also includes example Dedicated Operations Circuitry 1214. In this example, the Dedicated Operations Circuitry 1214 includes special purpose circuitry 1216 that may be invoked to implement commonly used functions to avoid the need to program those functions in the field. Examples of such special purpose circuitry 1216 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1200 may also include example general purpose programmable circuitry 1218 such as an example CPU 1220 and/or an example DSP 1222. Other general purpose programmable circuitry 1218 may additionally or alternatively be present such as a GPU, an XPU, etc., that can be programmed to perform other operations.

Although FIGS. 11 and 12 illustrate two example implementations of the processor circuitry 1012 of FIG. 10, many other approaches are contemplated. For example, as mentioned above, modern FPGA circuitry may include an on-board CPU, such as one or more of the example CPU 1220 of FIG. 12. Therefore, the processor circuitry 1012 of FIG. 10 may additionally be implemented by combining the example microprocessor 1100 of FIG. 11 and the example FPGA circuitry 1200 of FIG. 6. In some such hybrid examples, a first portion of the machine readable instructions represented by the flowcharts of FIGS. 8 and 9 may be executed by one or more of the cores 1102 of FIG. 11, a second portion of the machine readable instructions represented by the flowcharts of FIGS. 8 and 9 may be executed by the FPGA circuitry 1200 of FIG. 12, and/or a third portion of the machine readable instructions represented by the flowcharts of FIGS. 8 and 9 may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 1012 of FIG. 10 may be in one or more packages. For example, the microprocessor 1100 of FIG. 11 and/or the FPGA circuitry 1200 of FIG. 12 may be in one or more packages. In some examples, an XPU may be implemented by the processor circuitry 1012 of FIG. 10, which may be in one or more packages. For example, the XPU may include a CPU in one package, a DSP in another package, a GPU in yet another package, and an FPGA in still yet another package.

Figure 13:
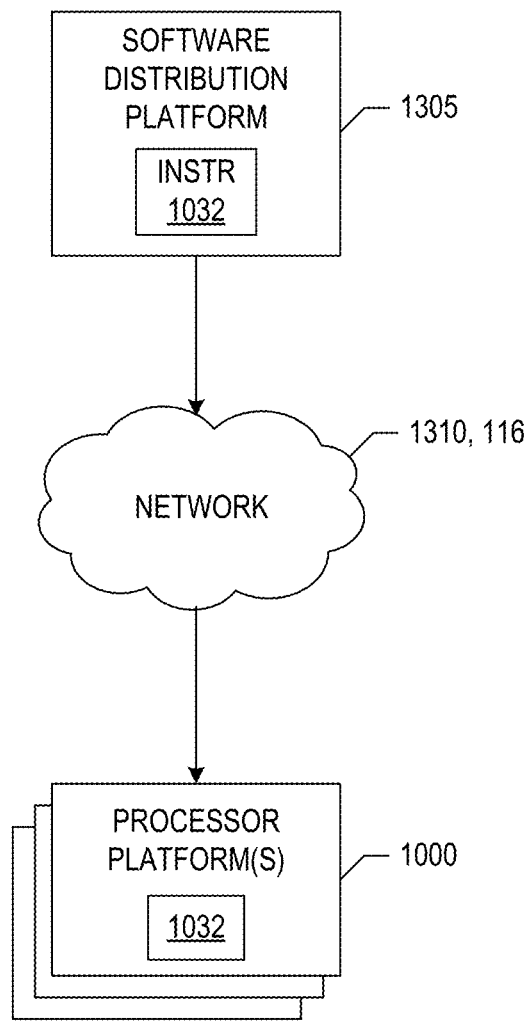
FIG. 13 is a block diagram of an example software distribution platform (e.g., one or more servers) to distribute software (e.g., software corresponding to the example machine readable instructions of FIGS. 8 and 9) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1305 to distribute software such as the example machine readable instructions 1032 of FIG. 10 to hardware devices owned and/or operated by third parties is illustrated in FIG. 13. The example software distribution platform 1305 may be implemented by any computer server, data facility, cloud service, etc., capable of storing and transmitting software to other computing devices. The third parties may be customers of the entity owning and/or operating the software distribution platform 1305. For example, the entity that owns and/or operates the software distribution platform 1305 may be a developer, a seller, and/or a licensor of software such as the example machine readable instructions 1032 of FIG. 10. The third parties may be consumers, users, retailers, OEMs, etc., who purchase and/or license the software for use and/or re-sale and/or sub-licensing. In the illustrated example, the software distribution platform 1305 includes one or more servers and one or more storage devices. The storage devices store the machine readable instructions 1032, which may correspond to the example machine readable instructions of FIGS. 8 and 9, as described above. The one or more servers of the example software distribution platform 1305 are in communication with an example network 1310, which may correspond to any one or more of the Internet and/or any of the example networks 1310, 116 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1032 from the software distribution platform 1305. For example, the software, which may correspond to the example machine readable instructions of FIGS. 8 and 9, may be downloaded to the example processor platform 1000, which is to execute the machine readable instructions 1032 to implement the example sorting circuitry 114. In some examples, one or more servers of the software distribution platform 1305 periodically offer, transmit, and/or force updates to the software (e.g., the example machine readable instructions 1032 of FIG. 10) to ensure improvements, patches, updates, etc., are distributed and applied to the software at the end user devices.

From the foregoing, it will be appreciated that example systems, methods, apparatus, and articles of manufacture have been disclosed that enable accurate and computationally efficient determination of main pages. Examples disclosed herein can identify main pages and/or main page requests from extracted and/or parsed URIs and/or URLs that are captured in network traffic. Examples disclosed herein also enable accurate determination of duration time for main page views. Examples disclosed herein can determine a main page view utilizing encrypted information that identifies the main page. Examples disclosed herein can credit a main page view while discarding embedded traffic from crediting. Examples disclosed herein can accurately determine main page views from data obtained via a VPN connection.

Disclosed systems, methods, apparatus, and articles of manufacture improve the efficiency of using a computing device by accurately crediting a computing device with main page views and/or main page requests. Disclosed systems, methods, apparatus, and articles of manufacture are accordingly directed to one or more improvement(s) in the operation of a machine such as a computer or other electronic and/or mechanical device.

Example 1 includes an apparatus to identify a main page view, the apparatus comprising at least one memory, machine readable instructions, and processor circuitry to at least one of instantiate or execute the machine readable instructions to access a log of requests from a proxy, the log of requests including main page requests and embedded page requests, the log of requests including timestamps corresponding to the main page requests and the embedded page requests, identify, based on consecutive ones of the timestamps occurring within a time interval, at least one of the main page requests associated with the time interval, and credit the at least one of the main page requests as a main page view.

Example 2 includes the apparatus of example 1, wherein the time interval is 5 seconds.

Example 3 includes the apparatus of example 1, wherein the at least one of the main page requests includes a response time greater than response times of the embedded page requests.

Example 4 includes the apparatus of example 1, wherein the at least one of the main page requests has a data size greater than data sizes of ones of the embedded page requests.

Example 5 includes the apparatus of example 1, wherein the at least one of the main page requests includes a status code, the status code indicating the main page view.

Example 6 includes the apparatus of example 1, wherein the at least one of the main page requests includes a uniform resource locator (URL), the URL indicating the main page view.

Example 7 includes the apparatus of example 1, wherein the processor circuitry is to credit the at least one of the main page requests with a duration.

Example 8 includes the apparatus of example 1, wherein the processor circuitry is to identify the at least one of the main page requests based on same ones of the timestamps.

Example 9 includes the apparatus of example 1, wherein the processor circuitry is to discard the embedded page requests based on known embedded uniform resource identifiers (URIs).

Example 10 includes the apparatus of example 1, wherein the processor circuitry is to access the log of requests via a Virtual Private Network (VPN).

Example 11 includes the apparatus of example 10, wherein the processor circuitry is to identify the at least one of the main page requests based on a device lock status, the at least one of the main page requests accessed via the VPN.

Example 12 includes the apparatus of example 11, wherein the processor circuitry is to identify the at least one of the main page requests as the main page view when the device lock status is unlocked.

Example 13 includes the apparatus of example 11, wherein the processor circuitry is to identify the at least one of the main page requests as an embedded page view when the device lock status is locked.

Example 14 includes At least one non-transitory computer readable medium comprising instructions that, when executed cause processor circuitry to at least access a log of requests from a proxy, the log of requests including main page requests and embedded page requests, the log of requests including timestamps corresponding to the main page requests and the embedded page requests, and identify, based on consecutive ones of the timestamps occurring within a time interval, at least one of the main page requests associated with the time interval, and credit the at least one of the main page requests as a main page view.

Example 15 includes the at least one non-transitory computer readable medium of example 14, wherein the time interval is 5 seconds.

Example 16 includes the at least one non-transitory computer readable medium of example 14, wherein the at least one of the main page requests includes a response time greater than response times of the embedded page requests.

Example 17 includes the at least one non-transitory computer readable medium of example 14, wherein the at least one of the main page requests has a data size greater than data sizes of ones of the embedded page requests.

Example 18 includes the at least one non-transitory computer readable medium of example 14, wherein the at least one of the main page requests includes a status code, the status code indicating the main page view.

Example 19 includes the at least one non-transitory computer readable medium of example 14, wherein the at least one of the main page requests includes a uniform resource locator (URL), the URL indicating the main page view.

Example 20 includes the at least one non-transitory computer readable medium of example 14, wherein the instructions cause the processor circuitry to credit the at least one of the main page requests with a duration.

Example 21 includes the at least one non-transitory computer readable medium of example 14, wherein the instructions cause the processor circuitry to identify the at least one of the main page requests based on same ones of the timestamps.

Example 22 includes the at least one non-transitory computer readable medium of example 14, wherein the instructions cause the processor circuitry to discard the embedded page requests based on known embedded uniform resource identifiers (URIs).

Example 23 includes the at least one non-transitory computer readable medium of example 14, wherein the instructions cause the processor circuitry to access the log of requests via a Virtual Private Network (VPN).

Example 24 includes the at least one non-transitory computer readable medium of example 23, wherein the instructions cause the processor circuitry to identify the at least one of the main page requests based on a device lock status, the at least one of the main page requests accessed via the VPN.

Example 25 includes the at least one non-transitory computer readable medium of example 24, wherein the instructions cause the processor circuitry to identify the at least one of the main page requests as the main page view when the device lock status is unlocked.

Example 26 includes the at least one non-transitory computer readable medium of example 24, wherein the instructions cause the processor circuitry to identify the at least one of the main page requests as an embedded page view when the device lock status is locked.

Example 27 includes an apparatus comprising means for accessing a log of requests from a proxy, the log of requests including main page requests and embedded page requests, the log of requests including timestamps corresponding to the main page requests and the embedded page requests, and means for identifying, based on consecutive ones of the timestamps occurring within a time interval, at least one of the main page requests associated with the time interval, and means for crediting the at least one of the main page requests as a main page view.

Example 28 includes the apparatus of example 27, wherein the time interval is 5 seconds.

Example 29 includes the apparatus of example 27, wherein the at least one of the main page requests includes a response time greater than response times of the embedded page requests.

Example 30 includes the apparatus of example 27, wherein the at least one of the main page requests has a data size greater than data sizes of ones of the embedded page requests.

Example 31 includes the apparatus of example 27, wherein the at least one of the main page requests includes a status code, the status code indicating the main page view.

Example 32 includes the apparatus of example 27, wherein the at least one of the main page requests includes a uniform resource locator (URL), the URL indicating the main page view.

Example 33 includes the apparatus of example 27, wherein the means for crediting is to credit the at least one of the main page requests with a duration.

Example 34 includes the apparatus of example 27, wherein means for identifying to identify the at least one of the main page requests based on same ones of the timestamps.

Example 35 includes the apparatus of example 27, further including means for discarding the embedded page requests based on known embedded uniform resource identifiers (URIs).

Example 36 includes the apparatus of example 27, wherein the means for accessing is to access the log of requests via a Virtual Private Network (VPN).

Example 37 includes the apparatus of example 36, wherein the means for identifying is to identify the at least one of the main page requests based on a device lock status, the at least one of the main page requests accessed via the VPN.

Example 38 includes the apparatus of example 37, wherein the means for identifying is to identify the at least one of the main page requests as the main page view when the device lock status is unlocked.

Example 39 includes the apparatus of example 37, wherein the means for identifying is to identify the at least one of the main page requests as an embedded page view when the device lock status is locked.

Example 40 includes a method comprising accessing a log of requests from a proxy, the log of requests including main page requests and embedded page requests, the log of requests including timestamps corresponding to the main page requests and the embedded page requests, and identifying, based on consecutive ones of the timestamps occurring within a time interval, at least one of the main page requests associated with the time interval, and crediting the at least one of the main page requests as a main page view.

Example 41 includes the method of example 40, wherein the time interval is 5 seconds.

Example 42 includes the method of example 40, wherein the at least one of the main page requests includes a response time greater than response times of the embedded page requests.

Example 43 includes the method of example 40, wherein the at least one of the main page requests has a data size greater than data sizes of ones of the embedded page requests.

Example 44 includes the method of example 40, wherein the at least one of the main page requests includes a status code, the status code indicating the main page view.

Example 45 includes the method of example 40, wherein the at least one of the main page requests includes a uniform resource locator (URL), the URL indicating the main page view.

Example 46 includes the method of example 40, wherein crediting the at least one of the main page requests includes a duration.

Example 47 includes the method of example 40, wherein identifying the at least one of the main page requests is based on same ones of the timestamps.

Example 48 includes the method of example 40, further including discarding the embedded page requests based on known embedded uniform resource identifiers (URIs).

Example 49 includes the method of example 40, wherein accessing the log of requests includes a Virtual Private Network (VPN).

Example 50 includes the method of example 49, wherein identifying the at least one of the main page requests is based on a device lock status, the at least one of the main page requests accessed via the VPN.

Example 51 includes the method of example 50, further including crediting the at least one of the main page requests as a main page view based on the device lock status being unlocked.

Example 52 includes the method of example 50, further including crediting the at least one of the main page requests as an embedded page view based on the device lock status being locked.

It is noted that this patent claims priority from U.S. Provisional Patent Application No. 63/295,438, which was filed on Dec. 30, 2021, and is hereby incorporated by reference in its entirety.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A computing system to credit webpage access by a client device, the computing system comprising:
   a processor; and
   at least one memory storing machine readable instructions that, when executed by the processor, cause the computing system to perform operations comprising:
      accessing, from a proxy server, a log of requests made from the client device, the log of requests specifying a respective timestamp for each of the requests;
      based on a length of a response time corresponding to a particular one of the requests relative to other response times corresponding to the other requests, identifying the particular one of the requests as a main page request that causes one or more servers to return a main webpage to present;
      determining that the timestamps of the other requests occurred within a particular time interval relative to the timestamp of the main page request;

based on the determination that the timestamps of the other requests occurred within the particular time interval relative to the timestamp of the main page request, identifying the other requests as embedded page requests that cause the one or more servers to return embedded webpages to present within the main webpage; and based on identifying the main page request and the embedded requests:
- crediting the client device with viewing the main webpage corresponding to the main page request; and
- discarding the embedded page requests from the crediting.

2. The computing system of claim 1, wherein the particular time interval is 5 seconds.

3. The computing system of claim 1, wherein identifying the particular one of the requests as the main page request based on the length of the response time corresponding to the particular one of the requests relative to the other response times corresponding to the other requests comprises identifying the particular one of the requests as the main page request based on the length of the response time corresponding to the particular one of the requests being greater than the other response times corresponding to the other requests.

4. The computing system of claim 1, wherein identifying the particular one of the requests as the main page request is further based on a data size of the response time corresponding to the particular one of the requests being greater than other data sizes of the other requests.

5. The computing system of claim 1, wherein the main page request includes a status code, the status code indicating the main webpage.

6. The computing system of claim 1, wherein the main page request includes a uniform resource locator (URL), the URL indicating the main webpage.

7. The computing system of claim 1, wherein crediting the client device with viewing the main webpage corresponding to the main page request comprises crediting the client device with viewing the main webpage for a particular duration.

8. The computing system of claim 1, wherein determining that the timestamps of the other requests occurred within the particular time interval relative to the timestamp of the main page request comprises determining that the timestamps of the other requests occurred are the same as the timestamp of the main page request.

9. The computing system of claim 1, wherein discarding the embedded page requests from crediting is further based on a determination that the embedded page requests are associated with known embedded uniform resource identifiers (URIs).

10. The computing system of claim 1, wherein accessing the log of requests comprises accessing the log of requests via a Virtual Private Network (VPN), and wherein the main webpage is accessed via the VPN.

11. The computing system of claim 1, the operations further comprising:
- determining, for each of the requests, a corresponding lock status of the client device, wherein crediting the client device with viewing the main webpage corresponding to the main page request is further based on the lock status corresponding to the main page request, and
- wherein discarding the embedded page requests from the crediting based on the lock statuses corresponding to the embedded page requests comprises discarding the embedded page requests from the crediting based on the lock statuses corresponding to the embedded page requests being locked statuses.

12. The computing system of claim 11, wherein crediting the client device with viewing the main webpage corresponding to the main page request based on the lock status corresponding to the main page request comprises crediting the client device with viewing the main webpage corresponding to the main page request based on the lock status corresponding to the main page request being an unlocked status, and
- wherein discarding the embedded page requests from the crediting based on the lock statuses corresponding to the embedded page requests comprises discarding the embedded page requests from the crediting based on each of the lock statuses corresponding to the embedded page requests each being a locked status.

13. A non-transitory computer readable medium comprising instructions that, when executed, cause a processor to perform operations comprising:
- accessing, from a proxy server, a log of requests made from a client device, the log of requests specifying a respective timestamp for each of the requests;
- based on a length of a response time corresponding to a particular one of the requests relative to other response times corresponding to the other requests, identifying the particular one of the requests as a main page request that causes one or more servers to return a main webpage to present:
- determining that the timestamps of the other requests occurred within a particular time interval relative to the timestamp of the main page request;
- based on the determination that the timestamps of the other requests occurred within the particular time interval relative to the timestamp of the main page request, identifying the other requests as embedded page requests that cause the one or more servers to return embedded webpages to present within the main webpage; and
- based on identifying the main page request and the embedded requests:
  - crediting the client device with viewing the main webpage corresponding to the main page request; and
  - discarding the embedded page requests from the crediting.

14. The non-transitory computer readable medium of claim 13, wherein crediting the client device with viewing the main webpage corresponding to the main page request comprises crediting the client device with viewing the main webpage for a particular duration.

15. The non-transitory computer readable medium of claim 13, the operations further comprising:
- determining, for each of the requests, a corresponding lock status of the client device, wherein crediting the client device with viewing the main webpage corresponding to the main page request is further based on the lock status corresponding to the main page request, and
- wherein discarding the embedded page requests from the crediting based on the lock statuses corresponding to the embedded page requests comprises discarding the embedded page requests from the crediting based on the lock statuses corresponding to the embedded page requests being locked statuses.

16. The non-transitory computer readable medium of claim 13, wherein identifying the particular one of the requests as the main page request based on the length of the response time corresponding to the particular one of the requests relative to the other response times corresponding to the other requests comprises identifying the particular one of the requests as the main page request based on the length of the response time corresponding to the particular one of the requests being greater than the other response times corresponding to the other requests.

17. The non-transitory computer readable medium of claim 13, wherein determining that the timestamps of the other requests occurred within the particular time interval relative to the timestamp of the main page request comprises determining that the timestamps of the other requests occurred are the same as the timestamp of the main page request.

18. A method performed by a computing system, the method comprising:
- accessing, from a proxy server, a log of requests made from a client device, the log of requests specifying a respective timestamp for each of the requests;
- based on a length of a response time corresponding to a particular one of the requests relative to other response times corresponding to the other requests, identifying the particular one of the requests as a main page request that causes one or more servers to return a main webpage to present;
- determining that the timestamps of the other requests occurred within a particular time interval relative to the timestamp of the main page request;
- based on the determination that the timestamps of the other requests occurred within the particular time interval relative to the timestamp of the main page request, identifying the other requests as embedded page requests that cause the one or more servers to return embedded webpages to present within the main webpage; and
- based on identifying the main page request and the embedded requests:
  - crediting the client device with viewing the main webpage corresponding to the main page request; and
  - discarding the embedded page requests from the crediting.

19. The method of claim 18, wherein identifying the particular one of the requests as the main page request based on the length of the response time corresponding to the particular one of the requests relative to the other response times corresponding to the other requests comprises identifying the particular one of the requests as the main page request based on the length of the response time corresponding to the particular one of the requests being greater than the other response times corresponding to the other requests.

20. The method of claim 18, wherein determining that the timestamps of the other requests occurred within the particular time interval relative to the timestamp of the main page request comprises determining that the timestamps of the other requests occurred are the same as the timestamp of the main page request.

* * * * *